US012563259B2

(12) United States Patent
Xue et al.

(10) Patent No.: US 12,563,259 B2
(45) Date of Patent: Feb. 24, 2026

(54) METHOD FOR RESUMING PLAYING AUDIO AND SYSTEM

(71) Applicant: Huawei Technologies Co., Ltd., Shenzhen (CN)

(72) Inventors: Qingfeng Xue, Xi'an (CN); Jiachen Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 274 days.

(21) Appl. No.: 18/284,473

(22) PCT Filed: Mar. 22, 2022

(86) PCT No.: PCT/CN2022/082199
§ 371 (c)(1),
(2) Date: Sep. 27, 2023

(87) PCT Pub. No.: WO2022/206472
PCT Pub. Date: Oct. 6, 2022

(65) Prior Publication Data
US 2024/0163505 A1 May 16, 2024

(30) Foreign Application Priority Data
Mar. 29, 2021 (CN) .......................... 202110338288.3

(51) Int. Cl.
*H04N 21/4363* (2011.01)
*H04N 21/41* (2011.01)
(Continued)

(52) U.S. Cl.
CPC ..... *H04N 21/4363* (2013.01); *H04N 21/4126* (2013.01); *H04N 21/439* (2013.01); *H04N 21/835* (2013.01)

(58) Field of Classification Search
CPC ........... H04N 21/4363; H04N 21/4126; H04N 21/439; H04N 21/835; H04N 21/435; (Continued)

(56) References Cited

U.S. PATENT DOCUMENTS

2002/0094087 A1* 7/2002 Dellmo ................. H04W 12/02
380/270
2010/0260348 A1* 10/2010 Bhow .............. H04N 21/25891
381/81
(Continued)

FOREIGN PATENT DOCUMENTS

CN 105430436 A 3/2016

*Primary Examiner* — Kathy W Wang-Hurst
*Assistant Examiner* — Garth D Richmond
(74) *Attorney, Agent, or Firm* — Slater Matsil, LLP

(57) ABSTRACT

This application provides a method for continuing playback of audio. In the method, a wearable device can send a MAC address of a mobile device paired with the wearable device to a remote control device, the remote control device sends the MAC address of the mobile device to an electronic device, the electronic device sends playback information of current playback content on the electronic device to the mobile device based on the MAC address of the mobile device, and the mobile device can resume playing, based on the playback information, an audio of the playback content that is being played on the electronic device.

20 Claims, 11 Drawing Sheets

(51) Int. Cl.
   *H04N 21/439*          (2011.01)
   *H04N 21/835*          (2011.01)
(58) Field of Classification Search
   CPC ...... H04N 21/43615; H04N 21/43637; H04W
                12/047; H04W 12/03; H04W 12/33;
                         H04W 12/50; H04W 76/14
   See application file for complete search history.

(56)                References Cited

U.S. PATENT DOCUMENTS

2016/0077710 A1*   3/2016   Lewis ..................... G06F 3/011
                                                         715/716
2018/0191403 A1*   7/2018   Pierson ................ H04B 17/318
2022/0066734 A1*   3/2022   So ........................... G06F 3/165

* cited by examiner

Remote control device 400

Antenna 1  Antenna 2

Wireless communication module
Wi-Fi/Bluetooth/ZigBee/Wireless data
transmission module
[350]

Internal
memory [321]

External
memory
interface [320]

Processor
[310]

Sensor module
[360]

USB interface
[330]

Charging input

Charging
management
module
[340]

Power management
module [341]

Battery [342]

900

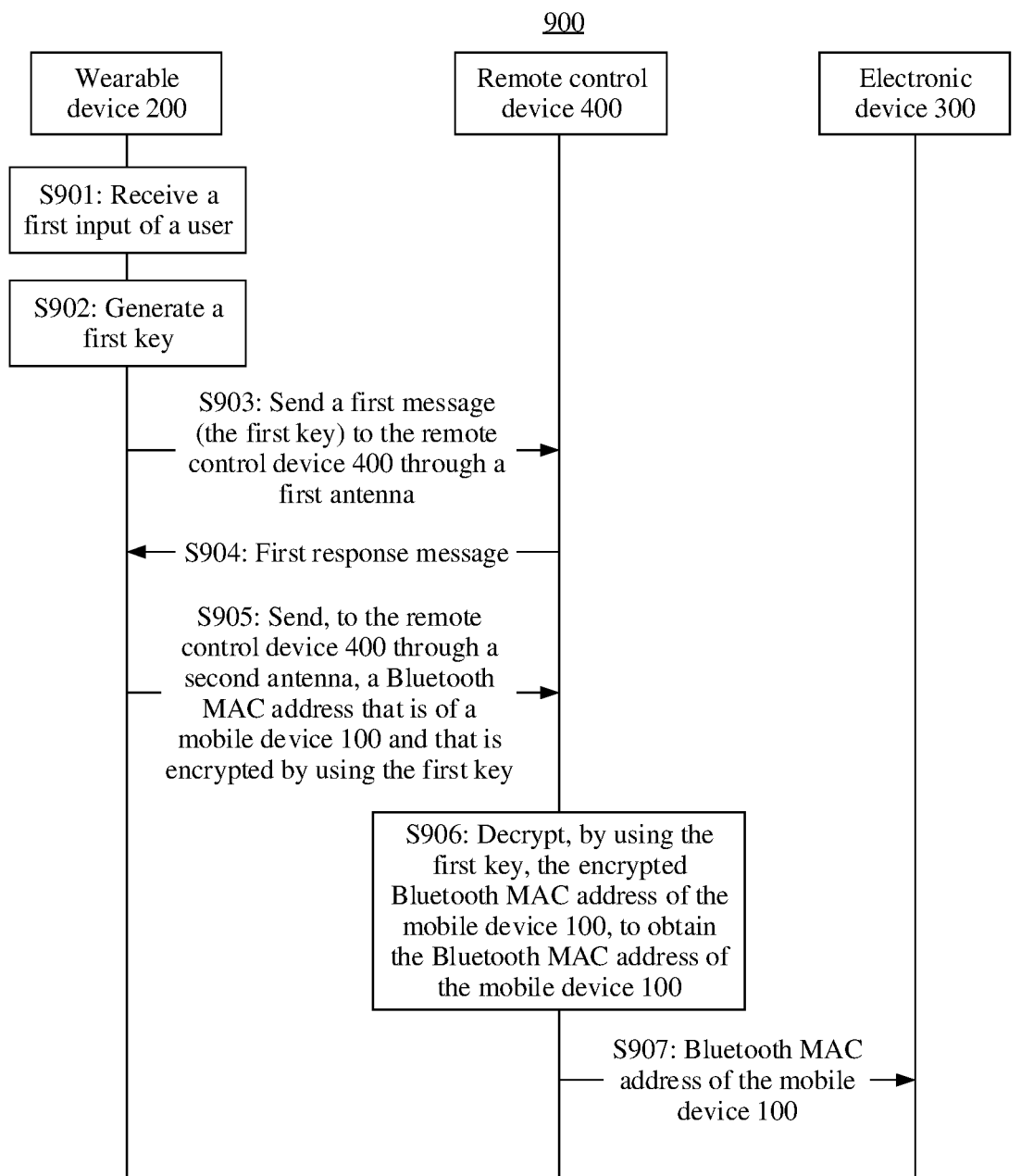

| Wearable device 200 | Remote control device 400 | Electronic device 300 |

S901: Receive a first input of a user

S902: Generate a first key

S903: Send a first message (the first key) to the remote control device 400 through a first antenna S904: First response message S905: Send, to the remote control device 400 through a second antenna, a Bluetooth MAC address that is of a mobile device 100 and that is encrypted by using the first key S906: Decrypt, by using the first key, the encrypted Bluetooth MAC address of the mobile device 100, to obtain the Bluetooth MAC address of the mobile device 100

S907: Bluetooth MAC address of the mobile device 100

FIG. 9

METHOD FOR RESUMING PLAYING AUDIO AND SYSTEM

CROSS REFERENCE TO RELATED APPLICATIONS

This application is a national stage of International Application No. PCT/CN2022/082199, filed on Mar. 22, 2022, which claims priority to Chinese Patent Application No. 202110338288.3, filed on Mar. 29, 2021. Both of the aforementioned applications are hereby incorporated by reference in their entireties.

TECHNICAL FIELD

This application relates to the terminal field, and in particular, to a method for resuming playing an audio and a system.

BACKGROUND

Intelligent devices provide great convenience for users and are widely used. However, the users still get inconvenience in some scenarios. For example, a user suddenly needs to go out when watching a video or an audio/video on a smart television in a room. As a result, the user cannot continue to watch the video or the audio/video on the smart television because the user goes out, and a thought of the user is quickly switched from a video or an audio/video plot to the reality. This affects immersive experience of the user, and results in poor user experience. Therefore, how to provide a method for improving immersive experience of the user in the foregoing scenario becomes our requirements.

SUMMARY

To resolve the foregoing technical problem, this application provides a method for resuming playing an audio and a system. The technical solutions provided in this application, can improve immersive experience of a user to some extent in the foregoing scenario, and the method is easy to operate and is easy to use by the user.

According to a first aspect, a method for resuming playing an audio is provided, including: A wearable device sends a media access control MAC address of a mobile device paired with the wearable device to a remote control device, where the remote control device is configured to control an electronic device.

The remote control device sends the MAC address of the mobile device to the electronic device.

The electronic device sends playback information of current playback content on the electronic device to the mobile device based on the MAC address of the mobile device, where the playback content includes a video or an audio/video; and the mobile device resumes playing, based on the playback information, an audio corresponding to the playback content by using the wearable device.

In the foregoing solution, the wearable device can send the MAC address of the mobile device paired with the wearable device to the remote control device, the remote control device can send the MAC address of the mobile device to the electronic device, the electronic device can send, based on the MAC address of the mobile device, the playback information of the current playback content on the electronic device to the mobile device, and the mobile device can resume playing, based on the playback information, the audio corresponding to the playback content by using the wearable device. This avoids inconvenience for the user to watch or listen to the playback content played on the electronic device. The user can listen, by using the wearable device, to the audio corresponding to the playback content played on the electronic device. This helps improve user experience.

Optionally, the current playback content on the electronic device may be a video, an audio, or an audio/video.

In some possible implementations, the playback information includes at least one of a name of the playback content, an identifier of the playback content, a playback progress of the playback content, a resource link of the playback content, a playback type of the playback content, or a uniform resource locator URL format that is of a resource and that is corresponding to the resource link of the playback content. The mobile device can determine, based on the playback information, the playback content played on the electronic device, obtain an audio to be resumed playing, and play, by using the wearable device, the audio to be resumed playing.

In some possible implementations, that a wearable device sends a media access control MAC address of a mobile device paired with the wearable device to a remote control device includes: The wearable device receives a specific input of a user, and the wearable device sends the MAC address of the mobile device to the remote control device in response to the specific input.

In some possible implementations, before the wearable device sends the MAC address of the mobile device to the remote control device, the method further includes:

The wearable device receives a first input of a user;

the wearable device generates a first key based on the first input;

the wearable device sends a first message to the remote control device through a first antenna, where the first message includes the first key, a maximum transmitting distance of the first antenna is a first transmitting distance, and the first transmitting distance is shorter than a preset transmitting distance; and the remote control device sends a first response message corresponding to the first message to the wearable device.

That the wearable device sends a MAC address of the mobile device to a remote control device includes:

The wearable device sends, to the remote control device through a second antenna, the MAC address that is of the mobile device and that is encrypted by using the first key, where a maximum transmitting distance of the second antenna is a second transmitting distance, and the second transmitting distance is shorter than the first transmitting distance.

Before the remote control device sends the MAC address of the mobile device to the electronic device, the method further includes:

The remote control device decrypts, by using the first key, the encrypted MAC address of the mobile device, to obtain the MAC address of the mobile device.

In the foregoing solution, the wearable device can generate the first key based on triggering of the first input, and send, through the first antenna, the first message that carries the first key to the remote control device. Because the first antenna is a weak antenna, the remote control device receives the first message only within the first transmitting distance of the first antenna. This can ensure security of the first key. The remote control device can send a response message corresponding to the first message to the wearable device. The wearable device further sends, to the remote control device through the second antenna, the MAC address that is of the mobile device and that is encrypted by using the first key. The second antenna is a strong antenna, and the second transmitting distance of the second antenna is greater than the first transmitting distance of the first antenna, so that an activity range of the remote control device or the wearable device can be increased, and the MAC address that is of the mobile device and that is encrypted by using the first key can also be received even if a distance between the remote control device and the wearable device is slightly longer, provided that the distance does not exceed the second transmitting distance. In addition, the MAC address that is of the mobile device and that is encrypted by using the first key is used, and this can also improve security of the MAC address of the mobile device.

In some possible implementations, that the wearable device sends a MAC address of the mobile device to a remote control device includes: The wearable device sends the MAC address of the mobile device to the remote control device through the first antenna. The first antenna is the weak antenna. This can ensure that the wearable device sends the MAC address of the mobile device to the remote control device within a safe range, avoid leakage of the MAC address of the mobile device, and helps improve security.

In some possible implementations, before the wearable device sends the MAC address of the mobile device to the remote control device, the method further includes: The wearable device sends a fourth message to the remote control device through the first antenna, where the fourth message is used to request the remote control device to resume playing the audio corresponding to the playback content played on the electronic device; and the wearable device receives a response message corresponding to the fourth message sent by the remote control device. That the wearable device sends a MAC address of the mobile device to a remote control device includes: The wearable device sends the MAC address of the mobile device to the remote control device through the first antenna.

In some possible implementations, before the wearable device sends the MAC address of the mobile device to the remote control device, the method further includes:

The remote control device receives a second input of a user;

the remote control device generates a second key based on the second input; and the remote control device sends a second message to the wearable device through a third antenna, where the second message includes the second key, a maximum transmitting distance of the third antenna is a first transmitting distance, and the first transmitting distance is shorter than a preset transmitting distance.

That the wearable device sends a MAC address of the mobile device to a remote control device includes:

The wearable device sends the MAC address that is of the mobile device and that is encrypted by using the second key to the remote control device.

Before the remote control device sends the MAC address of the mobile device to the electronic device, the method further includes:

The remote control device decrypts, by using the second key, the encrypted MAC address of the mobile device, to obtain the MAC address of the mobile device; and the remote control device sends a second response message to the wearable device through a fourth antenna, where a maximum transmitting distance of the fourth antenna is a second transmitting distance, and the second transmitting distance is shorter than the first transmitting distance.

In the foregoing solution, the remote control device can generate the second key based on triggering of the second input, and send, through the third antenna, the second message that carries the second key to the wearable device. Because the third antenna is a weak antenna, the wearable device receives the second message only within the first transmitting distance of the third antenna. This can ensure security of the second key. After the wearable device receives the second message sent by the remote control device, the wearable device can encrypt the MAC address of the mobile device by using the second key, and send the encrypted MAC address of the mobile device to the remote control device. This can improve security of sending the MAC address of the mobile device. The remote control device can decrypt, by using the second key, the encrypted MAC address of the mobile device, and after obtaining the MAC address of the mobile device, the remote control device sends the second response message to the wearable device through the fourth antenna. The fourth antenna is a strong antenna, and the second transmitting distance of the fourth antenna is greater than the first transmitting distance of the third antenna, so that an activity range of the remote control device or the wearable device can be increased, and the second response message can also be received even if a distance between the remote control device and the wearable device is slightly longer, provided that the distance does not exceed the second transmitting distance.

In some possible implementations, the remote control device may send a fifth message through the third antenna, where the fifth message may be a resuming playing service broadcast message, indicating that the electronic device controlled by the remote control device supports a resuming playing service, and the wearable device may receive the fifth message within the first transmitting distance of the third antenna. That the wearable device sends a MAC address of the mobile device to a remote control device includes: After receiving the fifth message, the wearable device sends a Bluetooth MAC address of the mobile device to the remote control device. The third antenna is a weak antenna. This can ensure that a wearable device that is closer to the control device can receive the fifth message. The wearable device sends the MAC address of the mobile device to the remote control device only after receiving the fifth message. This helps improve security of sending the MAC address of the mobile device by the wearable device.

In some possible implementations, the MAC address of the mobile device includes the Bluetooth MAC address of the mobile device.

Before the wearable device sends the media access control MAC address of the mobile device paired with the wearable device to the remote control device, the method further includes:

The wearable device obtains the Bluetooth MAC address of the mobile device in a process of establishing a Bluetooth channel with the mobile device.

In some possible implementations, that the electronic device sends, to the mobile device based on the MAC address of the mobile device, playback information of playback content played on the electronic device includes:

The electronic device establishes a Bluetooth channel with the mobile device based on the Bluetooth MAC address of the mobile device; and the electronic device sends the playback information to the mobile device through the Bluetooth channel between the electronic device and the mobile device.

In the foregoing solution, the wearable device can obtain the Bluetooth MAC address of the mobile device in a process of performing Bluetooth pairing with the mobile device. In this way, the electronic device can establish the Bluetooth channel with the mobile device based on the Bluetooth MAC address of the mobile device, and send the playback information to the mobile device through the Bluetooth channel.

In some possible implementations, the MAC address of the mobile device includes a Wi-Fi MAC address of the mobile device, and the method further includes:

The wearable device sends a Wi-Fi MAC address request message of the mobile device to the mobile device through the Bluetooth channel between the wearable device and the mobile device; and the mobile device sends a Wi-Fi MAC address response message to the wearable device through the Bluetooth channel between the wearable device and the mobile device, where the Wi-Fi MAC address response message includes the Wi-Fi MAC address of the mobile device.

That the electronic device sends, to the mobile device based on the MAC address of the mobile device, playback information of playback content played on the electronic device includes:

The electronic device establishes a Wi-Fi channel with the mobile device based on the Wi-Fi MAC address of the mobile device; and the electronic device sends the playback information to the mobile device through the Wi-Fi channel.

In the foregoing solution, the wearable device can send the Wi-Fi MAC address request message of the mobile device to the mobile device through the Bluetooth channel, and the mobile device can send the Wi-Fi MAC address of the mobile device to the wearable device by using the Wi-Fi MAC address response message of the mobile device. In this way, the electronic device and the mobile device can establish the Wi-Fi channel, and the electronic device sends the playback information through the Wi-Fi channel.

Optionally, the playback information includes the playback type of the playback content. The mobile device can determine, based on the playback type of the playback content, whether the playback content is the audio. If the playback content is not the audio, but the video, or the audio/video, the mobile device obtains, based on the playback information, the audio corresponding to the playback content for resuming playing. This helps resume playing, by using the wearable device, the audio corresponding to the playback content played on the electronic device, facilitates listening by the user, and improves user experience.

According to a second aspect, a method for resuming playing an audio is provided, including: A wearable device sends a media access control MAC address of a mobile device paired with the wearable device to an electronic device, where the electronic device is configured to send, to the mobile device based on the MAC address, playback information of playback content played on the electronic device, the mobile device is configured to receive the playback information of the playback content played on the electronic device, and the playback content includes a video or an audio/video.

The wearable device plays an audio that is corresponding to the playback content and that is sent by the mobile device based on the playback information.

In the foregoing solution, the wearable device can send the MAC address of the mobile device paired with the wearable device to the electronic device. The electronic device can send, to the mobile device based on the MAC address of the mobile device, the playback information of the playback content currently played on the electronic device. The mobile device can obtain, based on the playback information, an audio corresponding to playback content that is not played on the electronic device, and play the obtained audio by using the wearable device. The user may continue to listen to the audio to be resumed playing. This helps improve user experience.

In some possible implementations, the playback information includes at least one of a name of the playback content, an identifier of the playback content, a playback progress of the playback content, or a resource link of the playback content.

In some possible implementations, that a wearable device sends a MAC address of a mobile device paired with the wearable device to an electronic device includes:

The wearable device sends the MAC address of the mobile device to a remote control device, where the remote control electronic device is configured to control the electronic device, and the remote control electronic device is configured to send the MAC address of the mobile device to the electronic device.

In some possible implementations, before the wearable device sends the MAC address of the mobile device to the remote control device, the method further includes:

The wearable device receives a first input of a user;

the wearable device generates a first key based on the first input;

the wearable device sends a first message to the remote control device through a first antenna, where the first message includes the first key, a maximum transmitting distance of the first antenna is a first transmitting distance, and the first transmitting distance is shorter than a preset transmitting distance; and the wearable device receives a first response message corresponding to the first message sent by the remote control device.

That the wearable device sends the MAC address of the mobile device to a remote control device includes:

The wearable device sends, to the remote control device through a second antenna, the MAC address that is of the mobile device and that is encrypted by using the first key, where a maximum transmitting distance of the second antenna is a second transmitting distance, and the second transmitting distance is shorter than the first transmitting distance.

In some possible implementations, that the wearable device sends the MAC address of the mobile device to a remote control device includes: The wearable device sends the MAC address of the mobile device to the remote control device through the first antenna. The first antenna is a weak antenna. This can ensure that the wearable device sends the MAC address of the mobile device to the remote control device within a safe range, avoid leakage of the MAC address of the mobile device, and helps improve security.

In some possible implementations, before the wearable device sends the MAC address of the mobile device to the remote control device, the method further includes: The wearable device sends a fourth message to the remote control device through the first antenna, where the fourth message is used to request the remote control device to resume playing an audio corresponding to the playback content played on the electronic device; and the wearable device receives a response message corresponding to the fourth message sent by the remote control device. That the wearable device sends the MAC address of the mobile device to a remote control device includes: The wearable device sends the MAC address of the mobile device to the remote control device through the first antenna.

In some possible implementations, before the wearable device sends the MAC address of the mobile device to the remote control device, the method further includes:

The wearable device receives a second message sent by the remote control device through a third antenna, where the second message includes the second key, a maximum transmitting distance of the third antenna is a first transmitting distance, and the first transmitting distance is shorter than a preset transmitting distance.

That the wearable device sends the MAC address of the mobile device to a remote control device includes:

The wearable device sends the MAC address that is of the mobile device and that is encrypted by using the second key to the remote control device; and the wearable device receives a second response message that is corresponding to the second message and that is sent by the remote control device through a fourth antenna, where a maximum transmitting distance of the fourth antenna is a second transmitting distance, and the second transmitting distance is shorter than the first transmitting distance.

In some possible implementations, the MAC address of the mobile device includes a Bluetooth MAC address of the mobile device.

Before the wearable device sends the MAC address of the mobile device paired with the wearable device to the electronic device, the method further includes:

The wearable device obtains the Bluetooth MAC address of the mobile device in a process of establishing a Bluetooth channel with the mobile device.

In some possible implementations, the MAC address of the mobile device includes a Wi-Fi MAC address of the mobile device, and the method further includes:

The wearable device sends a Wi-Fi MAC address request message of the mobile device to the mobile device through the Bluetooth channel between the wearable device and the mobile device; and the wearable device receives the Wi-Fi MAC address response message sent by the mobile device through the Bluetooth channel, where the Wi-Fi MAC address response message includes the Wi-Fi MAC address of the mobile device.

According to a third aspect, a system for resuming playing an audio is provided. The system includes at least two devices of the foregoing mobile device, wearable device, remote control device, and electronic device.

According to a fourth aspect, an electronic device is provided. The electronic device includes a processor, a memory, and a computer program. The computer program is stored in the memory, and when the computer program is executed by the processor, the electronic device is enabled to perform the method according to any one of the aspects and the implementations of the aspects.

For technical effect corresponding to any one of the fourth aspect and the implementations of the fourth aspect, refer to technical effect corresponding to any one of the foregoing aspects and the implementations of the aspects. Details are not described herein again.

According to a fifth aspect, a computer-readable storage medium is provided. The computer-readable storage medium stores a computer program (which may also be referred to as instructions or code). When the computer program is executed by a computer, the computer is enabled to perform the method according to any one of the aspects and the implementations of the aspects.

For technical effect corresponding to any one of the fifth aspect and the implementations of the fifth aspect, refer to technical effect corresponding to any one of the foregoing aspects and the implementations of the aspects. Details are not described herein again.

According to a sixth aspect, a chip is provided. The chip includes a processor and a memory. The processor is configured to read and execute a computer program stored in the memory, to perform the method according to any one of the aspects and the implementations of the aspects.

For technical effect corresponding to any one of the sixth aspect and the implementations of the sixth aspect, refer to technical effect corresponding to any one of the foregoing aspects and the implementations of the aspects. Details are not described herein again.

According to a seventh aspect, a computer program product is provided. The computer program product includes a computer program (which may also be referred to as instructions or code). When the computer program is executed by a computer, the computer is enabled to perform the method according to any one of the aspects and the implementations of the aspects.

For technical effect corresponding to any one of the seventh aspect and the implementations of the seventh aspect, refer to technical effect corresponding to any one of the foregoing aspects and the implementations of the aspects. Details are not described herein again.

BRIEF DESCRIPTION OF THE DRAWINGS

FIG. 9 is a schematic diagram of Embodiment 3 of a method for resuming playing an audio according to an embodiment of this application.

DETAILED DESCRIPTION OF ILLUSTRATIVE EMBODIMENTS

Figure 1:
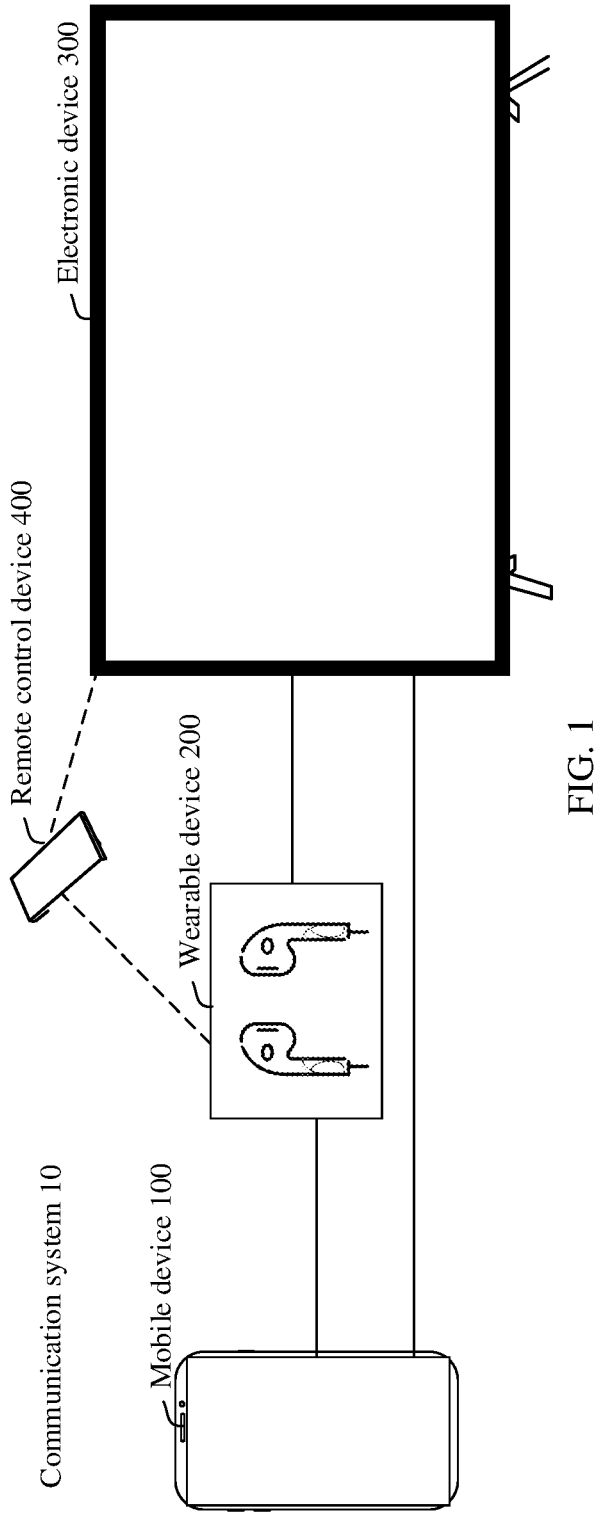
FIG. 1 is a schematic diagram of an architecture of a communication system according to an embodiment of this application.

The following describes the technical solutions in embodiments of this application with reference to the accompanying drawings in embodiments of this application.

In descriptions of embodiments of this application, terms used in the following embodiments are only intended to describe purposes of specific embodiments, but are not intended to limit this application. The terms "a", "the", "the foregoing", "this" and "the one" of singular forms used in this specification and the appended claims of this application are also intended to include expressions such as "one or more", unless otherwise specified in the context clearly. It should be further understood that in the following embodiments of this application, "at least one" and "one or more" mean one, two, or more (including two). The term "and/or" is used to describe an association relationship between associated objects and represents that three relationships may exist. For example, A and/or B may represent the following cases: Only A exists, both A and B exist, and only B exists, where A and B each may be singular or plural. The character "/" generally indicates an "or" relationship between the associated objects.

Reference to "an embodiment", "some embodiments", or the like described in this specification indicates that one or more embodiments of this application include a specific feature, structure, or characteristic described with reference to the embodiment. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner. The term "connection" includes a direct connection and an indirect connection, unless otherwise indicated. "First" and "second" are only intended for a purpose of description, and shall not be understood as an indication or implication of relative importance or implicit indication of the number of indicated technical features.

In embodiments of this application, the word "example", "for example", or the like is used to represent giving an example, an illustration, or a description. Any embodiment or design scheme described as "example" or "for example" in embodiments of this application should not be explained as being more preferred or having more advantages than another embodiment or design scheme. Exactly, use of the term "example", "for example", or the like is intended to present a relative concept in a specific manner.

Intelligent devices provide great convenience for users and are widely used. However, the users get inconvenience in some scenarios. For example, a user suddenly needs to go out when watching a video on an intelligent electronic device 300 in a room. As a result, the user cannot continue to watch the video on the intelligent electronic device 300 because the user goes out, and a thought of the user is quickly switched from a video plot to the reality. This affects immersive experience of the user, and resulting in poor user experience. Therefore, how to provide a method for improving immersive experience of the user in the foregoing scenario becomes our requirements.

To resolve the foregoing technical problem, this application provides a method for resuming playing an audio and an electronic device. The technical solutions provided in this application, can improve immersive experience of a user to some extent in the foregoing scenario, and the method is easy to operate and is easy to use by the user.

For example, FIG. 1 is a schematic diagram of an architecture of a communication system according to an embodiment of this application. As shown in FIG. 1, a communication system 10 includes a mobile device 100, a wearable device 200, and an electronic device 300. The mobile device 100 may communicate wirelessly with the wearable device 200. For example, the wireless communication manner may be Bluetooth (Bluetooth, BT), or Wi-Fi P2P. Bluetooth includes Bluetooth Low Energy (Bluetooth low energy, BLE). Optionally, the communication system 10 may further include a remote control device 400. The remote control device 400 is configured to control the electronic device 300.

The mobile device 100 includes but is not limited to a tablet computer, a portable electronic device (for example, a laptop computer (Laptop)), an intelligent electronic device 300 (for example, a smart screen), a smart speaker, an augmented reality (augmented reality, AR) device, a virtual reality (virtual reality, VR) device, and another intelligent device that is easy to move. An example embodiment of the mobile device 100 includes but is not limited to a portable electronic device using iOS®, Android®, Harmony®, Windows, Linux, or another operating system.

The wearable device 200 may be a smart headset shown in FIG. 1, or may be a wearable device that can output an audio, such as a smart helmet or an augmented reality (augmented reality, AR)/virtual reality (virtual reality, VR) device. In this embodiment of this application, an example in which the wearable device 200 is the smart headset is used for description. The smart headset may be of a plurality of types, for example, may be an earplug type, an in-ear type, an over-ear type, an earmuff type, or an ear hook type. The smart headset may include a first part and a second part that are separately worn on a left ear and a right ear of a user. The first part and the second part may be connected by using a connection cable, for example, the smart headset is a flex-form smart headset. Alternatively, the first part and the second part may be independent of each other, for example, the smart headset is a true wireless stereo (true wireless stereo, TWS) headset. Optionally, the wearable device completes pairing with the mobile device in advance.

The electronic device 300 includes but is not limited to an electronic device that can output a video, such as the intelligent electronic device 300 (for example, a smart screen), a fixed computer (for example, a desktop computer), a tablet computer, a portable electronic device (for example, a laptop computer (Laptop)), a smart speaker, an augmented reality (augmented reality, AR) device, or a virtual reality (virtual reality, VR) device. An example embodiment of the electronic device 300 includes but is not limited to an electronic device using iOS®, Android®, Harmony®, Windows, Linux, or another operating system. The remote control device 400 may communicate with the electronic device 300, and may control the electronic device 300.

The foregoing device types of the mobile device 100, the wearable device 200, the electronic device 300, and the remote control device 400 are only examples. The device types of the mobile device 100, the wearable device 200, the electronic device 300, and the remote control device 400 are not specifically limited in embodiments of this application.

Figure 2:
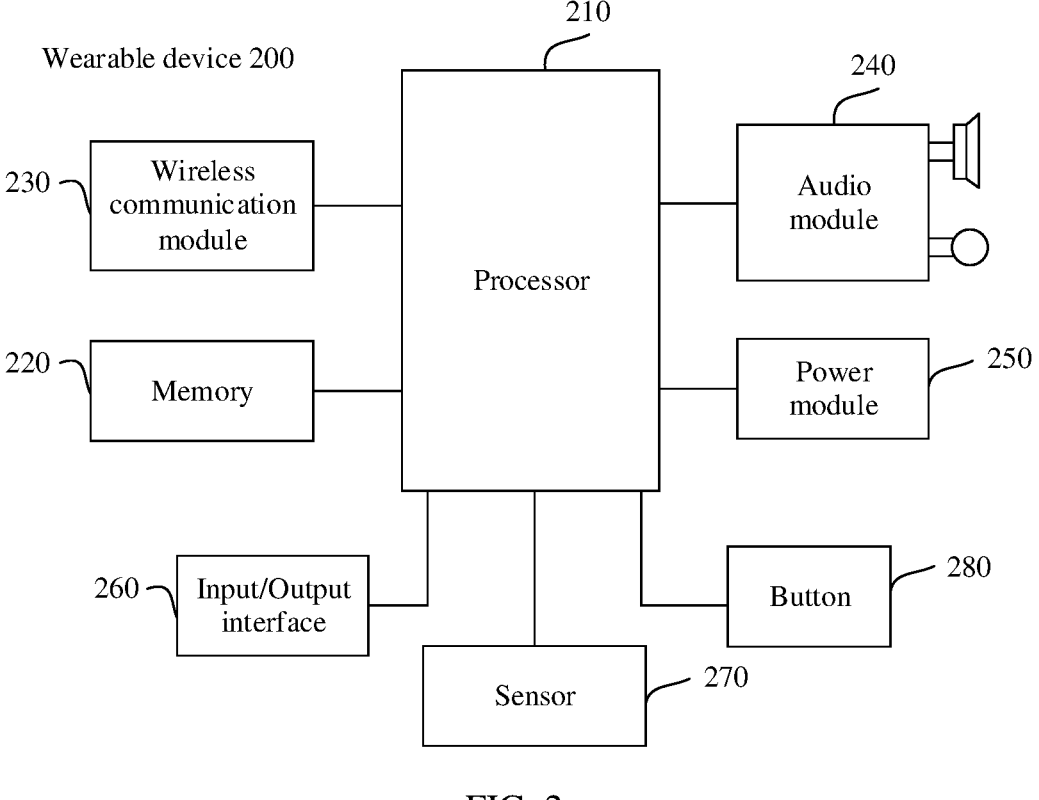
FIG. 2 is a schematic diagram of a structure of a wearable device 200 according to an embodiment of this application.

For example, FIG. 2 is a schematic diagram of a structure of the wearable device 200. The wearable device 200 may include at least one processor 210, at least one memory 220, a wireless communication module 230, an audio module 240, a power module 250, an input/output interface 260, and the like. The processor 210 may include one or more interfaces, configured to connect to another part of the wearable device 200. The following describes each part of the wearable device 200 in detail with reference to FIG. 2.

The memory 220 may be configured to store program code, for example, program code used to establish a physical connection between the wearable device 200 and the mobile device 100, process an audio service (for example, music playing, or answering/making a call) of the mobile device 100, charge the wearable device 200, and perform wireless pairing connection between the wearable device 200 and another electronic device.

The processor 210 may be configured to execute the foregoing application program code, and invoke a related module to implement a function of the wearable device 200 in embodiments of this application. For example, functions such as audio playback and answering/making a call between the wearable device 200 and another electronic device are implemented.

The wireless communication module 230 may be configured to support data exchange between the wearable device 200 and another electronic device or a box of the wearable device 200 by using a wireless communication technology. The wireless communication technology is, for example, Bluetooth (Bluetooth, BT).

In addition, the wireless communication module 230 may further include an antenna. The wireless communication module 230 receives an electromagnetic wave through the antenna, performs frequency modulation and filtering processing on an electromagnetic wave signal, and sends a processed signal to the processor 210. The wireless communication module 230 may further receive a to-be-sent signal from the processor 210, perform frequency modulation and amplification on the signal, and convert the signal into an electromagnetic wave for radiation through the antenna.

The audio module 240 may be configured to manage audio data, so that wearable device 200 inputs and outputs an audio stream. For example, the audio module 240 may obtain the audio stream from the wireless communication module 230, or transfer the audio stream to the wireless communication module 230, to implement functions such as answering/making a call, playing music, enabling/disabling a voice assistant of an electronic device connected to a headset, and receiving/sending voice data of a user by using the wearable device 200. The audio module 230 may include a speaker (or referred to as an earpiece or a receiver) component configured to output an audio stream, a microphone (or referred to as a mike or a mic), a microphone radio circuit cooperating with the microphone, and the like. The speaker may be configured to convert an audio electrical signal into a sound signal and play the sound signal. The microphone may be configured to convert a sound signal into an audio electrical signal.

The power module 250 may be configured to: provide system power for the wearable device 200; supply power to each module of the wearable device 200; support the wearable device 200 in receiving a charging input; and the like. The power module 250 may include a power management unit (power management unit, PMU) and a battery. The power management unit may receive an external charging input; perform voltage transformation on an electrical signal input from a charging path and provide a transformed electrical signal to the battery for charging; perform voltage transformation on an electrical signal provided by the battery and provide a transformed electrical signal for other modules such as the audio module 240 or the wireless communication module 230; and prevent battery overcharging, over-discharging, short-circuiting, overcurrent, or the like. In some embodiments, the power module 250 may further include a wireless charging coil for wirelessly charging the wearable device 200. In addition, the power management unit may be also configured to monitor parameters such as a battery capacity, a battery cycle count, and a battery health status (electric leakage or impedance).

The plurality of input/output interfaces 260 may be configured to provide a wired connection between the wearable device 200 and a box of the wearable device 200 for charging or communication. In some embodiments, the input/output interface may be a USB interface.

In addition, the wearable device 200 may further include a sensor 270. For example, the sensor 270 may be a distance sensor or an optical proximity sensor, and may be configured to determine whether the wearable device 200 is worn by a user. For example, the wearable device 200 may detect, by using the distance sensor, whether an object exists near the wearable device 200, to determine whether the wearable device 200 is worn by the user. When determining that the wearable device 200 is worn, the wearable device 200 may turn on a speaker.

It can be understood that the structure illustrated in this embodiment of this application does not constitute a specific limitation on the wearable device 200. The wearable device 200 may have more or fewer parts than those shown in FIG. 2, or combine two or more parts, or have different part configurations. For example, an outer surface of the wearable device 200 may further include parts such as a button 280, an indicator light (which may indicate a battery level, an incoming/outgoing a call, a pairing mode, and the like), a display (which may prompt the user with related information), and a dust filter (which may be used in cooperation with the receiver). The button 280 may be a physical button, a touch button (used in cooperation with the touch sensor), or the like, and is configured to trigger operations such as powering on, powering off, pausing, playing, recording, starting pairing, and resetting.

It may be understood that the parts shown in FIG. 2 do not constitute specific limitation on the wearable device 200. The wearable device 200 may alternatively include more or fewer parts than those shown in the figure, or some parts may be combined, or some parts may be split, or different part arrangements may be used.

Figure 3:
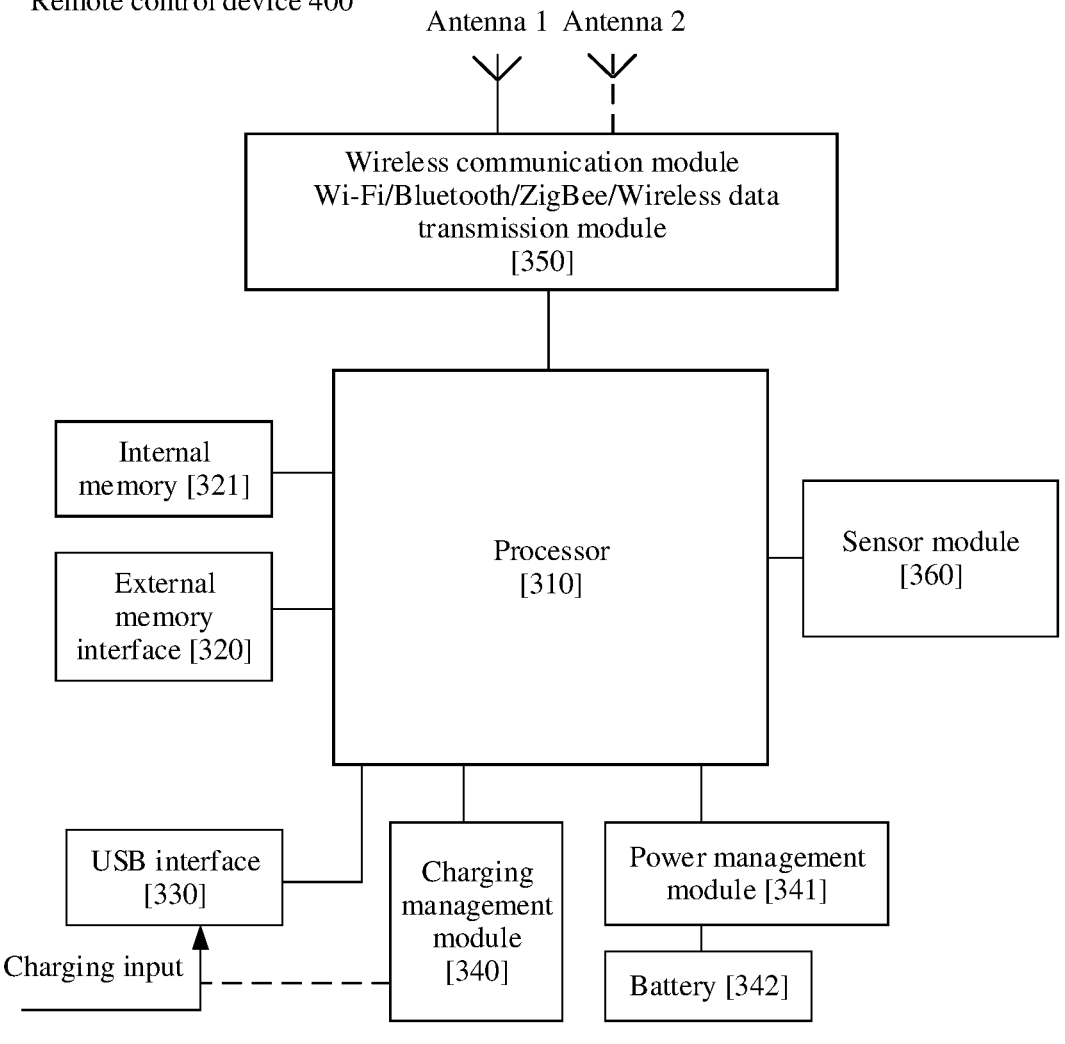
FIG. 3 is a schematic diagram of a hardware structure of a remote control device 400 according to an embodiment of this application.

For example, FIG. 3 is a schematic diagram of a hardware structure of the remote control device 400. As shown in FIG. 3, the remote control device 400 may include a processor 310, an external memory interface 320, an internal memory 321, a universal serial bus (universal serial bus, USB) interface 330, a charging management module 340, a power management module 341, a battery 342, an antenna 1, an antenna 2, a wireless communication module 350, a sensor module 360, and the like.

It can be understood that the structure illustrated in this embodiment of this application does not constitute a specific limitation on the remote control device 400. In some other embodiments of this application, the remote control device 400 may include more or fewer parts than those shown in the figure, or some parts may be combined, or some parts may be split, or different part arrangements may be used. The parts shown in the figure may be implemented by hardware, software, or a combination of software and hardware.

The processor 310 may include one or more processing units. For example, the processor 310 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent parts, or may be integrated into one or more processors. In some embodiments, the remote control device 400 may alternatively include one or more processors 310. The controller may generate an operation control signal based on instruction operation code and a time sequence signal, to complete control of instruction fetching and instruction execution.

In some embodiments, the processor 310 may include one or more interfaces. The interface may include an inter-integrated circuit (inter-integrated circuit, I2C) interface, an integrated circuit sound (integrated circuit sound, I2S) inter-face, a pulse code modulation (pulse code modulation, PCM) interface, a universal asynchronous receiver/transmit-ter (universal asynchronous receiver/transmitter, UART) interface, a mobile industry processor interface (mobile industry processor interface, MIPI), a general-purpose input/output (general-purpose input/output, GPIO) interface, a SIM card interface, a USB interface, and/or the like. The USB interface 330 is an interface that conforms to a USB standard specification, and may be specifically a mini USB interface, a micro USB interface, a USB Type C interface, or the like. The USB interface 330 may be configured to connect to a charger to charge the remote control device 400, or may be configured to transmit data between the remote control device 400 and a peripheral device.

It can be understood that an interface connection relation-ship between the modules illustrated in this embodiment of this application is only an example for description, and does not constitute a limitation on the structure of the remote control device 400. In some other embodiments of this application, the remote control device 400 may alternatively use an interface connection manner different from that in the foregoing embodiment, or use a combination of a plurality of interface connection manners.

A wireless communication function of the remote control device 400 may be implemented through the antenna 1, the antenna 2, the wireless communication module 350, and the like.

The wireless communication module 350 may provide a wireless communication solution that is applied to the remote control device 400 and that includes Wi-Fi (includ-ing Wi-Fi sensing and Wi-Fi AP), Bluetooth (Bluetooth, BT), a short-distance wireless communication technology (near field communication, NFC), and a wireless data trans-mission module (for example, 433 MHz, 868 MHz, or 915 MHz). The wireless communication module 350 may be one or more components integrating at least one communication processor module. The wireless communication module 350 receives an electromagnetic wave through the antenna 1 or the antenna 2 (or the antenna 1 and the antenna 2), performs filtering and frequency modulation processing on an elec-tromagnetic wave signal, and sends a processed signal to the processor 310. The wireless communication module 350 may further receive a to-be-sent signal from the processor 310, perform frequency modulation and amplification on the signal, and convert the signal into an electromagnetic wave for radiation through the antenna 1 or the antenna 2.

The external memory interface 320 may be configured to connect to an external memory card, for example, a micro SD card, to extend a storage capability of the remote control device 400. The external storage card communicates with the processor 310 through the external memory interface 320, to implement a data storage function. For example, files such as music and videos are stored in the external storage card.

The internal memory 321 may be configured to store one or more computer programs, and the one or more computer programs include instructions. The processor 310 may run the instructions stored in the internal memory 321, so that the remote control device 400 performs a method for resum-ing playing an audio in some embodiments of this applica-tion, various applications, data processing, and the like. The internal memory 321 may include a code storage area and a data storage area. The code storage area may store an operating system. The data storage area may store data created during use of the remote control device 400, and the like. In addition, the internal memory 321 may include a high-speed random access memory, or may include a non-volatile memory, for example, one or more magnetic disk storage parts, a flash memory part, or a universal flash storage (universal flash storage, UFS). In some embodi-ments, the processor 310 may run the instructions stored in the internal memory 321 and/or the instructions stored in the memory that is disposed in the processor 310, to enable the remote control device 400 to perform the method for resum-ing playing the audio in embodiments of this application, other applications, and data processing.

A schematic diagram of a hardware structure of the electronic device 300 and a schematic diagram of a hard-ware structure of the mobile device 100 are similar to the schematic diagram of the hardware structure of the remote control device 400 in FIG. 3. To avoid repetition, details are not described in this embodiment of this application.

Figure 4A:
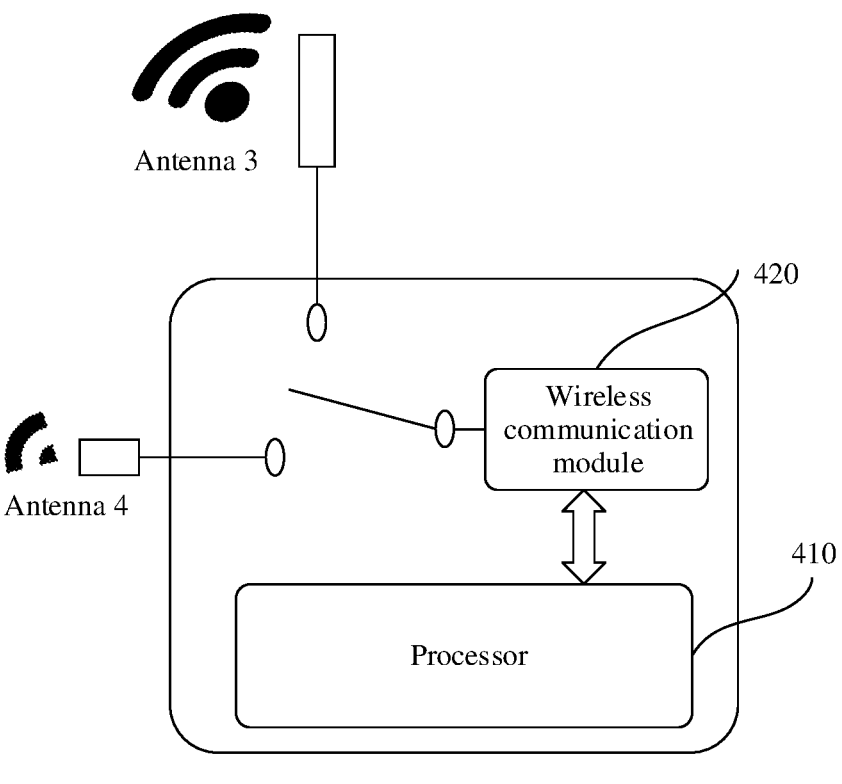
FIG. 4A and FIG. 4B each are a schematic diagram of a structure of a principle of a wireless communication module and an antenna in a wearable device 200 according to an embodiment of this application.

In an example, FIG. 4A shows a structure of a principle of a wireless communication module and an antenna in the wearable device 200 according to this embodiment of this application.

As shown in FIG. 4A, the wearable device 200 includes a processor 410, a wireless communication module 420, an antenna 3, and an antenna 4. The antenna 3 (for example, a strong antenna) and the antenna 4 (for example, a weak antenna) are configured to transmit and receive electromag-netic waves. Further, the wireless communication module 420 converts an electromagnetic wave received from the antenna 3 or the antenna 4 into a signal, and sends the signal to the processor 410 for processing; or the wireless com-munication module 420 receives a to-be-sent signal from the processor 410, and converts the to-be-sent signal into an electromagnetic wave for radiation through the strong antenna or the weak antenna. In this embodiment of this application, a second transmitting distance (for example, 10 meters or 5 meters, and this may be specifically set by a user) for transmitting a signal by the strong antenna is greater than a first transmitting distance (for example, 0.2 meter or 0.3 meter, and this may be specifically set by the user) for transmitting a signal by the weak antenna. The first trans-mitting distance for transmitting the signal by the weak antenna is shorter than or equal to a preset transmitting distance. The preset transmitting distance is a distance for exchanging secret information between the wearable device 200 and the remote control device 400, or a distance for exchanging secret information between the wearable device 200 and the electronic device 300. It may be understood that second transmitting distances of different devices may be the same or different, and first transmitting distances of different devices may be the same or different.

In an embodiment, the preset transmitting distance is a secure distance for exchanging the secret information between the wearable device 200 and the remote control device 400 or a secure distance for exchanging the secret information between the wearable device 200 and the elec-tronic device 300. For example, the preset transmitting distance may be 50 cm, 40 cm, 30 cm, or 20 cm. In this way, the secret information sent by the wearable device 200 can be received only when the remote control device 400 or the electronic device 300 is located within a range of a transmitting distance that is shorter than or equal to the preset transmitting distance and that is from the wearable device 200. In this way, a security risk is reduced (for example, the secret information is not received by another device beyond 50 cm away from the wearable device 200). A user with the wearable device 200 may move the wearable device 200 close to the remote control device 400 or the electronic device 300 only when the surroundings are secure. This improves security.

In some embodiments, the processor 410 may control switching between the strong antenna and the weak antenna. When the wearable device 200 uses the strong antenna, the electronic device 300 or the remote control device 400 receives a signal sent by the wearable device 200 only when a distance between the wearable device 200 and the electronic device 300 is shorter than the second transmitting distance, or a distance between the wearable device 200 and the remote control device 400 is shorter than the second transmitting distance. When the wearable device 200 uses the weak antenna, the electronic device 300 or the remote control device 400 receives a signal sent by the wearable device 200 only when a distance between the electronic device 300 or the remote control device 400 and the wearable device 200 is shorter than the first transmitting distance. The second transmitting distance is greater than the preset transmitting distance, and the first transmitting distance is shorter than or equal to the preset transmitting distance.

The wearable device 200 in FIG. 4A is used as an example for description. In actual application, the electronic device 300 or the remote control device 400 is similar to the wearable device 200. To avoid repetition, details are not described.

Figure 4B:
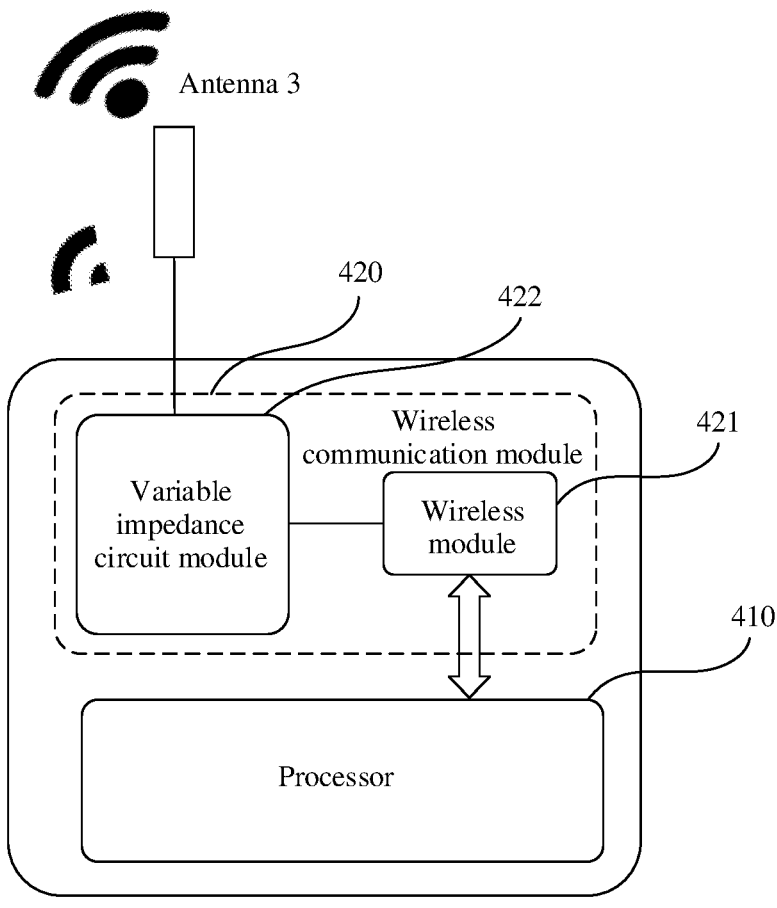

In another example, FIG. 4B shows a structure of a principle of a wireless communication module and an antenna in the wearable device 200 according to this embodiment of this application.

As shown in FIG. 4B, the wearable device 200 may include a processor 410, a wireless communication module 420, and an antenna 3. The wireless communication module 420 includes a wireless module 421 and a variable impedance circuit module 422. The antenna 3 is configured to transmit and receive wireless signals. The variable impedance circuit module 422 may be a circuit including variable impedance, an integrated line, or the like. The processor 410 adjusts, by controlling and adjusting a resistance value of the variable impedance circuit module 422, power loaded on the antenna 3, to control a transmitting distance for transmitting a wireless signal by the antenna 3. For example, when the resistance value of the variable impedance circuit module 422 is a first resistance value, transmitting power of the antenna 3 is second transmitting power. In this case, a distance for transmitting the wireless signal by the antenna 3 is a second transmitting distance (a function of a strong antenna is implemented). When the resistance value of the variable impedance circuit module 422 is a second resistance value, the transmitting power of the antenna 3 is first transmitting power. In this case, a distance for transmitting the wireless signal by the antenna 3 is a first transmitting distance (a function of a weak antenna is implemented). The second transmitting power is greater than the first transmitting power, the second transmitting distance is greater than a preset transmitting distance, and the first transmitting distance is shorter than or equal to the preset transmitting distance. In another example corresponding to FIG. 4B, other descriptions about the processor 410 and the wireless communication module 420 are the same as related descriptions in an example corresponding to FIG. 4A. Details are not described herein again.

The wireless communication modules 420 in FIG. 4A and FIG. 4B each may be the wireless communication module 230 in FIG. 2. The processors 410 in FIG. 4A and FIG. 4B each may be the processor 210 in FIG. 2.

It may be understood that the structure of the principle illustrated in the example corresponding to FIG. 4A and the structure of the principle illustrated in the another example corresponding to FIG. 4B do not constitute a specific limitation on the wireless communication module and the antenna in the wearable device 200. In some other embodiments, structures of the wireless communication module and the antenna in the wearable device 200 may include more or fewer parts than those shown in the figure, or some parts may be combined, or some parts may be split, or different part arrangements may be used. The parts shown in the figure may be implemented by hardware, software, or a combination of software and hardware.

Figure 5A:
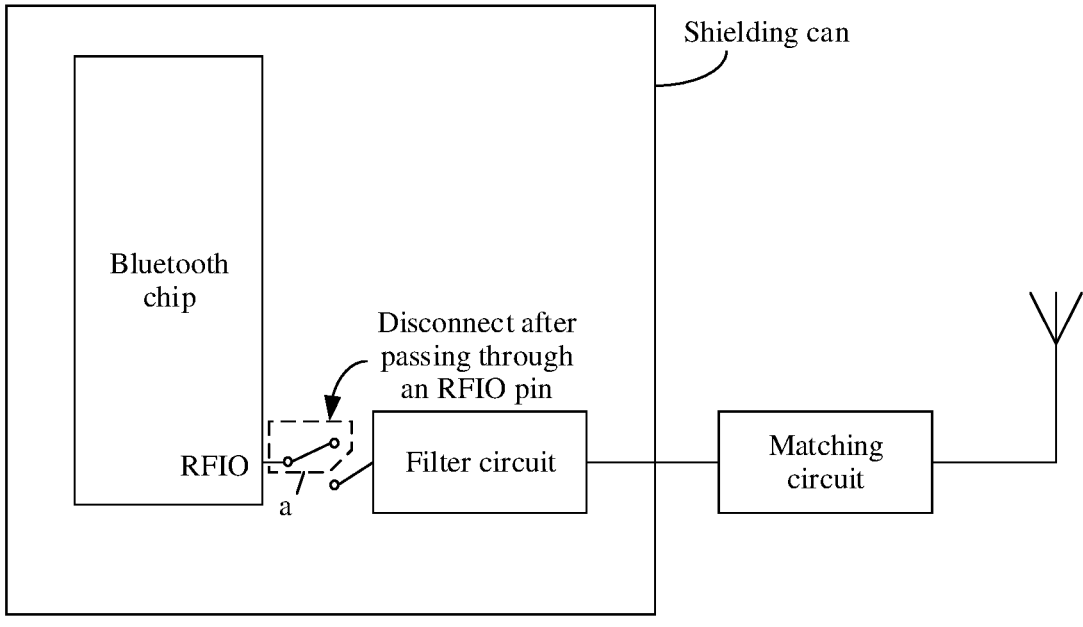
FIG. 5A to FIG. 5C each are a schematic diagram of a structure of an antenna in a wearable device 200 according to an embodiment of this application.
Figure 5B:
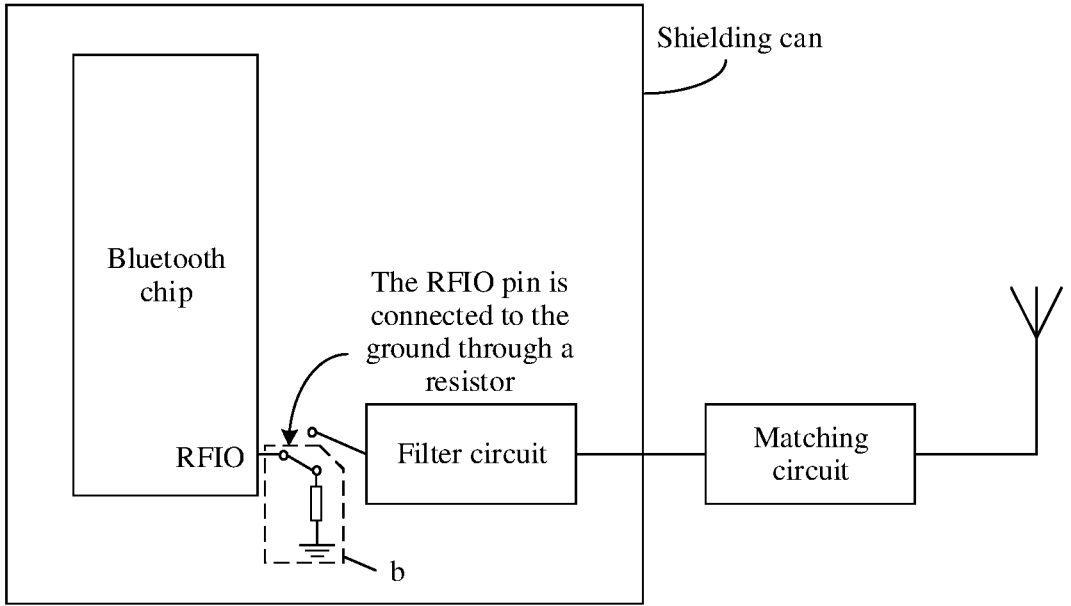
Figure 5C:
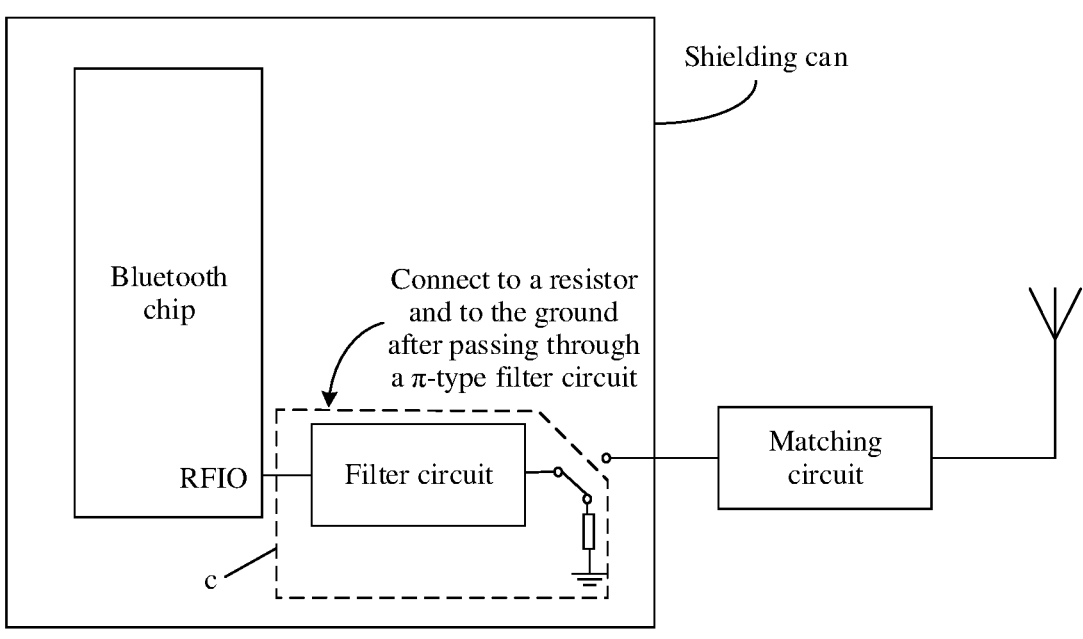

In some embodiments, the strong antenna and the weak antenna may share a part of cabling, for example, descriptions in embodiments shown in FIG. 5A to FIG. 5C.

For example, FIG. 5A to FIG. 5C show three implementations of the weak antenna in FIG. 4A. As shown in FIG. 5A to FIG. 5C, the strong antenna and the weak antenna may share a part of cabling.

In this embodiment of this application, the strong antenna and the weak antenna in the wearable device 200 may be switched by using a radio frequency switch. Physically, both the weak antenna and the radio frequency switch (the weak antenna is shown in a dashed box in FIG. 5A to FIG. 5C) may be disposed in a shielding can, or the weak antenna may be disposed in a chip.

The weak antenna in this embodiment of this application is to reduce a transmitting distance as much as possible. A principle of constructing the weak antenna may be as follows:

(1) reducing a length of an antenna, to reduce an electromagnetic wave radiated to the air;

(2) reducing radiation efficiency, and converting, by using a resistor, partial electromagnetic wave radiation into heat energy to be consumed; and (3) reducing a return loss and reflecting partial radio frequency energy back to the inside of a chip.

The weak antenna may be specifically implemented by:

(i) shortening an antenna;

(ii) disconnecting a point in a path of a physical antenna, or grounding the point through a resistor, an inductor, or a capacitor;

(iii) using a shielding can, and the like.

It should be understood that specific implementations (i) and (ii) of the weak antenna may be implemented on a printed circuit board (printed circuit board, PCB) or the inside of the chip.

It should be further understood that a function of the shielding can is to block a path in which an electromagnetic wave is radiated by the antenna to the receiver, so as to achieve an objective of weakening radiation.

It should be further understood that the shortening the antenna means that the weak antenna is shorter than the strong antenna. Three structures of weak antennas are shown in FIG. 5A to FIG. 5C, and the weak antennas are shown in structures in the dashed box in FIG. 5A to FIG. 5C. Structures of the strong antenna in FIG. 5A to FIG. 5C are all connected to a filter circuit (for example, a r-type circuit), a matching circuit (for example, a r-type circuit), and an antenna body (for example, the antenna body may be a segment of metal cabling) outside the matching circuit by using a radio frequency input/output (radio frequency input/output, RFIO) pin. The weak antenna a shown in the dashed box in FIG. 5A, the weak antenna b shown in the dashed box in FIG. 5B, and the weak antenna c shown in the dashed box in FIG. 5C have different lengths, but the weak antennas each are shorter than the strong antenna. The filter circuit is configured to prevent interference, and the matching circuit is configured to match the strong antenna.

For example, as shown in FIG. 5A, the weak antenna a may be located in the shielding can. The weak antenna a may include the RFIO pin of a Bluetooth chip and a first-way switch in a two-way switch (the first-way switch is not connected to any component) in the shielding can. In some cases, the weak antenna a may further include cabling between the RFIO pin and the first-way switch. The two-way switch refers to a switch between the cabling or the RFIO pin and the filter circuit. The cabling or the RFIO pin may be connected or disconnected to the filter circuit by using the two-way switch. As shown in FIG. 5A, the first-way switch is a switch configured to connect the RFIO pin or the cabling and disconnected from the filter circuit. It should be understood that the two-way switch in this embodiment of this application may be a single pole double throw switch.

For example, as shown in FIG. 5B, the weak antenna b may be located in the shielding can. The weak antenna b may include the RFIO pin of a Bluetooth chip, a first-way switch in a two-way switch (the first-way switch is connected to a resistor), and a matching component in the shielding can. In some cases, the weak antenna b may further include first cabling between the RFIO pin and the first-way switch. In some cases, the weak antenna b may further include second cabling between the matching component and the ground. The matching component may be a resistor. A part of electromagnetic wave radiation may be converted, through the resistor grounding, into heat energy to be consumed, to reduce radiation efficiency of the weak antenna b. The two-way switch means a switch between the RFIO pin or the first cabling, the resistor, and the filter circuit. By using the switch, the RFIO pin or the first cabling may be connected to the resistor and disconnected from the filter circuit, or the RFIO pin or the first cabling may be disconnected from the resistor and connected to the filter circuit. The first-way switch is the switch that is in the two-way switch and that is connected to the matching component and disconnected from the filter circuit.

For example, as shown in FIG. 5C, the weak antenna c may be located in the shielding can. A matching component (for example, the resistor) is connected to the ground after passing through a chip-matched filter circuit. The weak antenna c may include the RFIO pin of a Bluetooth chip, the filter circuit, a first-way switch in a two-way switch (the first-way switch is connected to the resistor), and a matching component (for example, the resistor) in the shielding can. In some cases, the weak antenna c may further include first cabling between the RFIO pin and the filter circuit. In some cases, the weak antenna c may further include second cabling between the filter circuit and the matching component. A part of electromagnetic wave radiation may be converted, through the matching component (for example, the resistor) grounding, into heat energy to be consumed, to reduce radiation efficiency of the weak antenna c. The two-way switch means a switch between the filter circuit and the matching component in the shielding can and the matching circuit outside the shielding can. By using the two-way switch, the filter circuit and the matching component in the shielding can are connected, and the filter circuit is disconnected from the matching circuit outside the shielding can; or the filter circuit and the matching component in the shielding can are disconnected, and the filter circuit is connected to the matching circuit outside the shielding can. The first-way switch is a switch that connects the filter circuit and the matching component in the shielding can.

It should be understood that the strong antenna in FIG. 5A and FIG. 5B may include the RFIO pin, a second-way switch in the two-way switch, the filter circuit, the matching circuit, and the antenna body connected outside the matching circuit. In some cases, the strong antenna in FIG. 5A and FIG. 5B may further include cabling between the RFIO pin and the second-way switch of the two-way switch. The second-way switch is a switch configured to connect the RFIO pin and the filter circuit.

The strong antenna in FIG. 5C may include the RFIO pin, the filter circuit, the second-way switch in the two-way switch, the matching circuit, and the antenna body connected outside the matching circuit. In some cases, the strong antenna in FIG. 5C may further include cabling between the RFIO pin and the filter circuit. The second-way switch is a switch configured to connect the filter circuit in the shielding can and the matching circuit outside the shielding can.

It should be understood that the wireless communication module 420 shown in FIG. 4A may be a chip, or may be a chip and a circuit matching the chip. The wireless module 421 shown in FIG. 4B may be a chip, and the wireless communication module 420 shown in FIG. 4B may be a chip and a circuit matching the chip. For example, the chip is a Bluetooth chip, a Wi-Fi chip, or a ZigBee chip.

The different structures of weak antennas cooperate with different transmitting power (Tx power) of the chip, so that different ultra-short-haul communication requirements (for example, from 10 cm to 2 m) can be met.

For example, Table 1 shows communication distances of several different structures of weak antennas of the Wi-Fi chip in cooperation with different transmitting power.

TABLE 1

| Antenna structure | Transmitting power | |
| | Distance at maximum transmitting power | Distance at minimum transmitting power |
| --- | --- | --- |
| Weak antenna a | 1 m | 10 cm |
| Weak antenna b | 1.5 m | 50 cm |
| Weak antenna c | 2 m | 1 m |

Due to a characteristic of a physical component in the chip, a difference between the maximum transmitting power and the minimum transmitting power of the antenna is related. If the minimum transmitting power of the wearable device 200 is reduced to a very low value, the maximum transmitting power is also reduced. In this way, a distance requirement during normal working is not met. Because different wearable devices 200 have different structures and the wearable devices 200 have different security performance requirements, manufacturers of the wearable devices 200 may use different structures of weak antennas and transmitting power to ensure a communication distance of the wearable devices 200. For example, for different manufacturers of the wearable devices 200, thicknesses of housings of the wearable devices 200 may be different. In this case, when structures of weak antennas are the same and transmitting power is the same, communication distances at which the wearable devices 200 can be discovered may also be different. Different manufacturers of the wearable devices 200 may test and obtain, based on a structure of the wearable devices 200, a structure of the weak antenna, and specific transmitting power, a safety distance at which the wearable devices 200 is discovered. The user may set transmitting power for three types of weak antennas (the weak antenna a, the weak antenna b, and the weak antenna c) based on Table 1, and adjust the transmitting power based on a test result, so that the weak antennas reach a corresponding distance during transmission.

Figure 6:
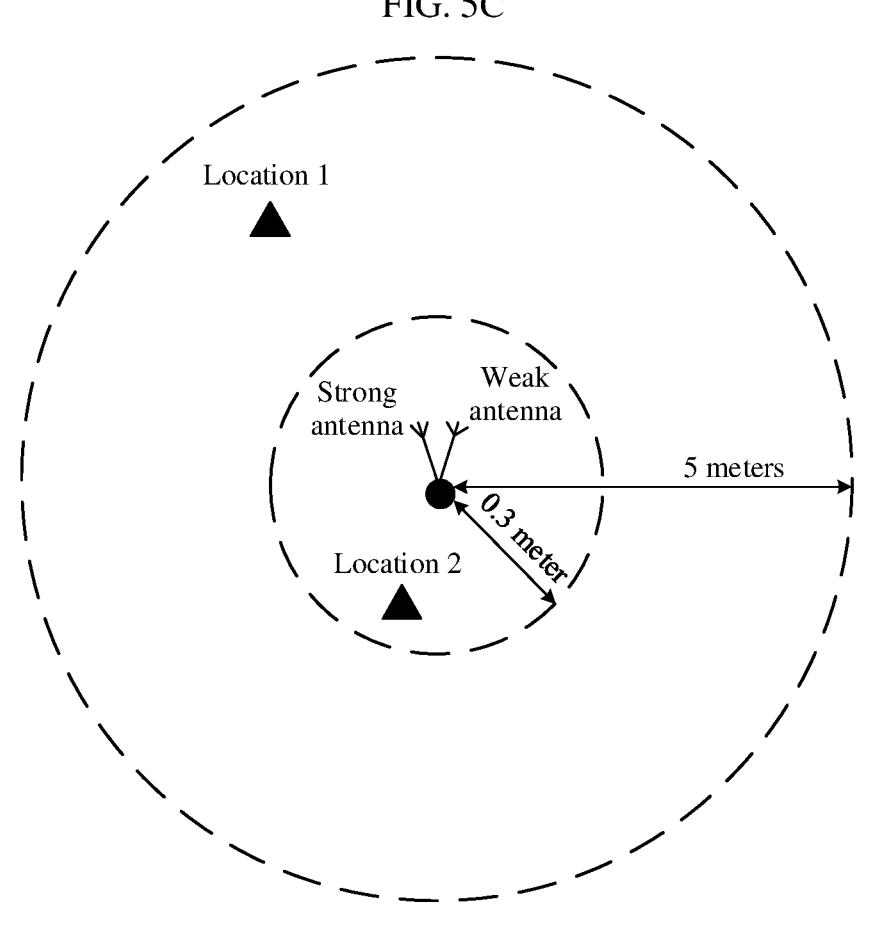
FIG. 6 is a schematic diagram of a transmitting distance of an antenna according to an embodiment of this application.

With reference to the foregoing example, an example in which the second transmitting distance is 5 meters and the first transmitting distance is 0.3 meter is used. When the electronic device uses a strong antenna, if a distance between the wearable device 200 and another device is shorter than the second transmitting distance (for example, the another device is located at a location 1 shown in FIG. 6), the wearable device 200 may communicate with the another device. When the wearable device 200 uses a weak antenna, if a distance between the wearable device 200 and the another device is shorter than the first transmitting distance (for example, the another device is located at a location 2 shown in FIG. 6), the wearable device 200 may communicate with the another device.

FIG. 4A and FIG. 4B, FIG. 5A to FIG. 5C, and FIG. 6 describe the structure of the principle the wireless communication module and the antenna in the wearable device 200. A structure of a principle of the wireless communication module and the antenna of the remote control device 400 or the electronic device 300 is similar to the structure of the principle of the wireless communication module and the antenna in the wearable device 200. To avoid repetition, details are not described in this embodiment of this application.

Embodiment 1

Figure 7:
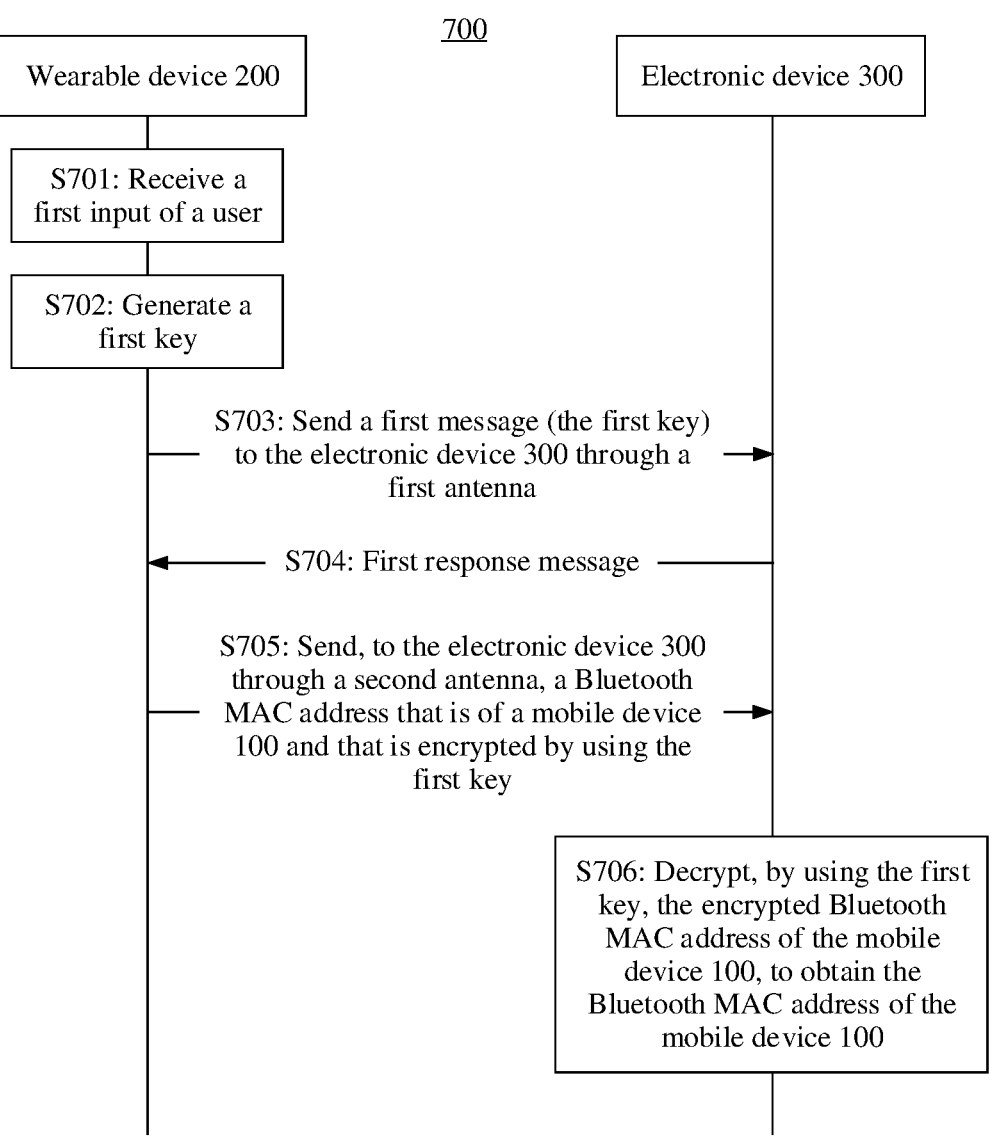
FIG. 7 is a schematic diagram of Embodiment 1 of a method for resuming playing an audio according to an embodiment of this application.

Embodiment 1 relates to FIG. 7. The following describes a method 700 for resuming playing an audio in an embodiment of this application with reference to FIG. 7. The method 700 includes the following steps.

S701: The wearable device 200 receives a first input of a user.

It may be understood that before S701, the wearable device 200 has performed Bluetooth pairing with the mobile device 100. In a process of pairing the wearable device 200 with the mobile device 100, the wearable device 200 may obtain a Bluetooth MAC address of the mobile device 100.

Specifically, the wearable device 200 receives the first input of the user, and the first input triggers the wearable device 200 to generate a first key, and sends a first message to the electronic device 300 through a first antenna, where the first message includes the first key. For example, when the user presses a button of the wearable device 200, or after the user removes the wearable device 200 from a box of the wearable device 200, the wearable device 200 may sense an operation of the user, that is, the wearable device 200 may receive an input of the user.

S702: The wearable device 200 generates the first key.

Specifically, the wearable device 200 may randomly generate the first key, for example, randomly generate the first key by using an algorithm. A manner of generating the first key is not limited in this embodiment of this application.

S703: The wearable device 200 sends the first message through the first antenna, where the first message includes the first key; and the electronic device 300 receives the first message sent by the wearable device 200, and obtains the first key in the first message.

The first message is used to request the electronic device 300 to resume playing an audio corresponding to current playback content on the electronic device 300. For example, the current playback content on the electronic device 300 may include a video, an audio, or an audio/video. If the current playback content on the electronic device 300 is a video, the first message is used to request the electronic device 300 to resume playing an audio corresponding to a current video of the electronic device 300. If the current playback content on the electronic device 300 is an audio, the first message is used to request the electronic device 300 to resume playing current audio of the electronic device 300. If the current playback content on the electronic device 300 is an audio/video, the first message is used to request the electronic device 300 to resume playing an audio corresponding to the audio/video currently played by the electronic device 300.

It may be understood that the first antenna may be a weak antenna, and a first transmitting distance for transmitting a signal by the first antenna is shorter than or equal to a preset transmitting distance. For example, the first antenna may be the antenna 4 in FIG. 4A, or the first antenna may be the antenna 3 in FIG. 4B. In this case, transmitting power of the antenna 3 in FIG. 4B is first transmitting power, and a distance for transmitting a wireless signal is the first transmitting distance. That the electronic device 300 receives the first message sent by the wearable device 200 includes: The electronic device 300 may receive, within the first transmitting distance of the first antenna in the wearable device 200, the first message sent by the wearable device 200.

Optionally, a manner in which the wearable device 200 may send the first message through the first antenna may be broadcast sending.

Optionally, the wearable device 200 sends an ultra-short distance packet through the first antenna. The ultra-short distance packet includes the first message. For example, a source address of the ultra-short distance packet is a Bluetooth MAC address of the wearable device 200, and a destination address of the ultra-short distance packet may be empty.

For example, if the user wants to resume playing an audio corresponding to playback content on the electronic device 300 to the mobile device 100, and play the audio by using the wearable device 200, the user may move the wearable device 200 to a place near the electronic device 300. After the movement, when a distance between the wearable device 200 and the electronic device 300 is shorter than the first transmitting distance, the wearable device 200 may send, to the electronic device 300 through the first antenna, the first message that carries the first key. This can ensure that the first key can be sent to only the electronic device 300, but not to another device. This can improve security.

S704: After receiving the first message, the electronic device 300 sends a first response message corresponding to the first message to the wearable device 200.

The first response message corresponding to the first message indicates that the electronic device 300 has received the first message.

For example, a source address of a packet that carries the response message in S704 is a Bluetooth MAC address of the electronic device 300, and a destination address is the source address in the ultra-short distance packet in S502, namely, the Bluetooth MAC address of the wearable device 200.

Optionally, the wearable device 200 may continuously send the first message in S703 within a preset time period through the first antenna. If the wearable device 200 does not receive, within the preset time period, the first response message returned by the electronic device 300, the process ends and S705 is not performed. For example, the preset time period is 3 seconds.

The first message and the first response message may be in a format specified in a protocol, that is, the wearable device 200 may send the first message according to the format specified in the protocol, and the electronic device 300 may parse the first message according to the format specified in the protocol. Similarly, the electronic device 300 may send the first response message according to the format specified in the protocol, and the wearable device 200 may parse the first response message according to the format specified in the protocol.

S705: The wearable device 200 sends, to the electronic device 300 through a second antenna, the Bluetooth MAC address that is of the mobile device 100 and that is encrypted by using the first key, and the electronic device 300 receives the Bluetooth MAC address that is of the mobile device 100 and that is encrypted by using the first key.

Specifically, a source address of the first response message in S704 is the Bluetooth MAC address of the electronic device 300. Therefore, the wearable device 200 may send the Bluetooth MAC address of the mobile device 100 to the electronic device 300 through the second antenna.

Optionally, S705 includes: The wearable device 200 sends an ultra-short distance packet to the electronic device 300 through the second antenna, where the ultra-short distance packet includes the Bluetooth MAC address of the mobile device 100. For example, a source address of a packet header of the ultra-short distance packet is the Bluetooth MAC address of the wearable device 200, a destination address is the Bluetooth MAC address of the electronic device 300, and a packet body may include the Bluetooth MAC address of the mobile device 100.

It may be understood that the second antenna may be a strong antenna, and a second transmitting distance for transmitting a signal by the second antenna is greater than the first transmitting distance. For example, the second antenna may be the antenna 3 in FIG. 4A, or the second antenna may be the antenna 3 in FIG. 4B. In this case, transmitting power of the antenna 3 in FIG. 4B is second transmitting power, and a distance for transmitting a wireless signal is the second transmitting distance. That the electronic device 300 receives the Bluetooth MAC address that is of the mobile device 100 and that is encrypted by using the first key includes: The electronic device 300 may receive, within the second transmitting distance of the second antenna in the wearable device 200, the Bluetooth MAC address that is of the mobile device 100 and that is encrypted by using the first key.

Optionally, in an alternative manner of S705, the wearable device 200 may encrypt a Wi-Fi MAC address of the mobile device 100 by using the first key, and then send the encrypted Wi-Fi MAC address to the electronic device 300. A manner in which the wearable device 200 obtains the Wi-Fi MAC address of the mobile device 100 is not limited.

For example, the wearable device 200 may establish a Wi-Fi channel with the mobile device 100. In a process of establishing the Wi-Fi channel, the wearable device 200 may obtain the Wi-Fi MAC address of the mobile device 100.

For another example, before S701, the wearable device 200 has performed Bluetooth pairing with the mobile device 100. After the wearable device 200 is paired with the mobile device 100, a Bluetooth channel exists between the wearable device 200 and the mobile device 100. The wearable device 200 can send a Wi-Fi MAC address request message to the mobile device 100 through the Bluetooth channel, and the mobile device 100 sends a Wi-Fi MAC address response message to the wearable device 200 through the Bluetooth channel, where the Wi-Fi MAC address response message includes the Wi-Fi MAC address of the mobile device 100.

In S703 to S705, the wearable device 200 can first send the first message, the electronic device 300 returns the first response message, and the wearable device 200 sends the Bluetooth MAC address of the mobile device 100 to the electronic device 300 when it is ensured that the wearable device 200 can communicate with the electronic device 300. This can improve security, and can avoid leakage of the Bluetooth MAC address of the mobile device 100.

In an alternative manner of S703 to S705, the wearable device 200 sends the first message to the electronic device 300 through the first antenna. The first message includes the Bluetooth MAC address of the mobile device 100. In this way, this can avoid signaling overheads caused when the wearable device 200 first sends the first message and then sends the Bluetooth MAC address of the mobile device 100.

In an alternative manner of S703 to S705, the electronic device 300 receives an operation instruction input by a user (for example, the user presses a button of the electronic device 300), and the electronic device 300 sends a third message through a fifth antenna (for example, the fifth antenna may be the antenna 4 in FIG. 4A; for another example, the fifth antenna may be the antenna 3 in FIG. 4B, and a maximum transmitting distance of the antenna 3 is the first transmitting distance), where a source address of a packet of the third message is the Bluetooth MAC address of the electronic device 300. The third message indicates that the electronic device 300 may receive a first message sent by another device, that is, the electronic device 300 supports a resuming playing service. The third message may also be referred to as a resuming playing service broadcast message. When the user wants to resume playing playback content played on the electronic device 300, the user puts the wearable device 200 close to the electronic device 300, and the wearable device 200 receives the third message sent by the electronic device 300. After the wearable device 200 receives the third message sent by the electronic device 300, the wearable device 200 sends the first message to the electronic device 300 based on the Bluetooth MAC address of the electronic device 300. The first message includes the Bluetooth MAC address of the mobile device 100, and the first message is used to request the electronic device 300 to resume playing current playback content on the electronic device 300. After receiving the first message, the electronic device 300 may send a response message corresponding to the first message to the wearable device 200 through a sixth antenna (for example, the sixth antenna may be the antenna 3 in FIG. 4A; for another example, the sixth antenna may be the antenna 3 in FIG. 4B, and the maximum transmitting distance of the antenna 3 is the second transmitting distance).

The electronic device 300 herein includes the fifth antenna and the sixth antenna. For the electronic device 300, the sixth antenna belongs to "the second antenna" of the electronic device 300. This is to avoid confusion in use of "the second antenna", and "the sixth antenna" is used for expression. Correspondingly, the fifth antenna belongs to "the first antenna" of the electronic device 300. This is also used to avoid confusion, and "the fifth antenna" is used for expression. In other words, using "the sixth antenna" for expression does not mean that the electronic device 300 includes at least six antennas, but is intended to avoid confusion in expression. That is, the electronic device 300 may include two antennas: "the fifth antenna" and "the sixth antenna", and the electronic device 300 is not required to have six antennas.

S706: The electronic device 300 decrypts, by using the first key, the encrypted Bluetooth MAC address of the mobile device 100, to obtain the Bluetooth MAC address of the mobile device 100.

Optionally, if the wearable device 200 sends the encrypted Wi-Fi MAC address in S705, in an alternative manner of S706, the electronic device 300 may decrypt, by using the first key, the encrypted Wi-Fi MAC address of the mobile device 100, to obtain the Wi-Fi MAC address of the mobile device 100.

In the foregoing Embodiment 1, the wearable device 200 generates the first key, and sends the first key to the electronic device 300 through the first antenna. The wearable device 200 can encrypt the Bluetooth MAC address or the Wi-Fi MAC address of the mobile device 100 by using the first key, and send the encrypted Bluetooth MAC address or the encrypted Wi-Fi MAC address to the electronic device 300. The electronic device 300 performs decryption by using the first key to obtain the Bluetooth MAC address of the mobile device 100 or the Wi-Fi MAC address of the mobile device 100.

Embodiment 2

Figure 8:
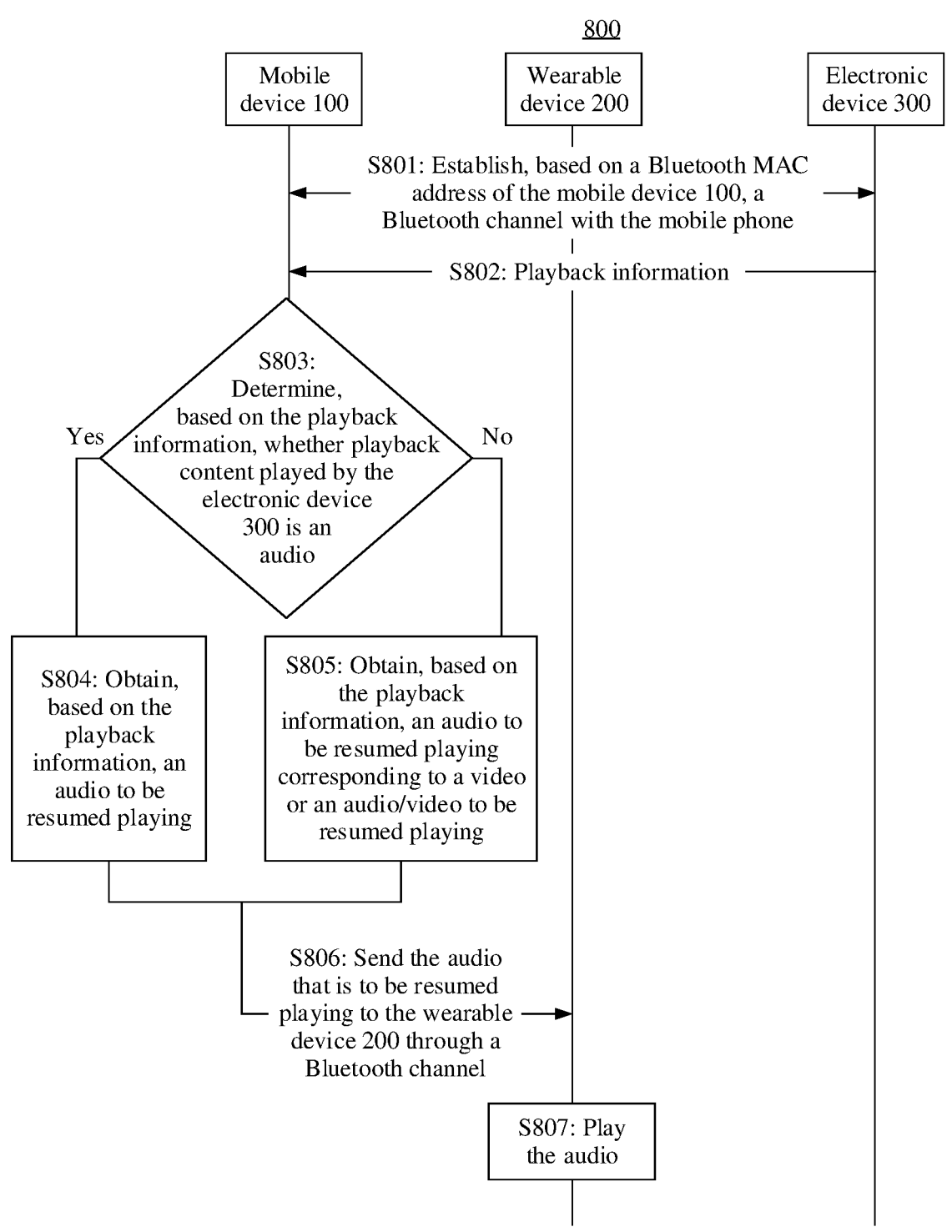
FIG. 8 is a schematic diagram of Embodiment 2 of a method for resuming playing an audio according to an embodiment of this application.

Embodiment 2 relates to FIG. 8. FIG. 8 shows a method 800 for resuming playing an audio. The method 800 includes the following steps.

S801: The electronic device 300 establishes a Bluetooth channel with the mobile device 100 based on the Bluetooth MAC address of the mobile device 100 obtained in the method 700.

In an alternative manner of S801, if the electronic device obtains the Wi-Fi MAC address of the mobile device 100 in the method 700, the electronic device 300 establishes a Wi-Fi channel with the mobile device 100 based on the Bluetooth MAC address of the mobile device 100.

Optionally, S706 can trigger the electronic device 300 to perform S801.

S802: The electronic device 300 sends, to the mobile device 100 through the Bluetooth channel in S801, playback information of playback content currently played, and the mobile device 100 receives, through the Bluetooth channel in S801, the playback information sent by the electronic device 300.

Optionally, the playback information may include at least one of a name of the playback content currently played on the electronic device 300, an ID of the playback content, a resource link of the playback content, a playback progress of the playback content, a playback type of the playback content, or a uniform resource locator (uniform resource locator, URL) format that is of a resource and that is corresponding to the resource link of the playback content.

S803: The mobile device 100 determines, based on the playback information, whether the playback content played on the electronic device 300 is an audio. If the playback content is the audio, S804 is performed; otherwise, S805 is performed.

For example, if the playback information includes the playback type of the playback content, the mobile device 100 can determine, based on a type of the playback content in the playback information, whether the playback content is the audio. The type of the playback content may be an audio, a video, or an audio/video. In this case, the mobile device 100 can directly determine, based on the type of the playback content, whether the playback content played on the electronic device 300 is the audio.

For example, if the playback information includes the URL format that is of the resource and that is corresponding to the resource link of the playback content, because URL formats of the video, the audio, and the audio/video are different, the mobile device 100 can determine, according to the URL format that is of the resource and that is corresponding to the resource link of the playback content, whether the playback content played on the electronic device 300 is the audio.

For example, when the playback information does not include the playback type of the playback content or the URL format that is of the resource and that is corresponding to the resource link of the playback content, but includes the resource link of the playback content, because URL formats of the video, an audio, and an audio/video are different, the mobile device 100 can obtain (for example, obtain from a server) the URL format corresponding to the resource link of the playback content, and the mobile device 100 determines, according to the URL format, whether the playback content is the audio.

For example, when the playback information does not include the playback type of the playback content or the URL format that is of the resource and that is corresponding to the resource link of the playback content, but includes the ID of the playback content, the mobile device 100 obtains (for example, obtains from the server) a playback type corresponding to the ID of the playback content, and the mobile device 100 determines, based on the playback type, whether the playback content played on the electronic device 300 is the audio.

S804: The mobile device 100 obtains, based on the playback information, an audio to be resumed playing.

Optionally, if the playback information includes the ID of the playback content and the playback progress, the mobile device 100 downloads, from the server based on the ID of the playback content, the audio played by the electronic device 300, and the mobile device 100 determines, based on the playback progress, the audio to be resumed playing. For example, if the playback progress indicates that the audio is played for 11 minutes and 2 seconds, the mobile device 100 determines that, the audio to be resumed playing is an audio starting from 11 minutes and 2 seconds.

Optionally, if the playback information includes the resource link of the playback content and the playback progress, the mobile device 100 downloads, from the server based on the resource link of the playback content, the audio played by the electronic device 300, and the mobile device 100 determines, based on the playback progress, the audio to be resumed playing.

Optionally, if the playback information includes the resource link of the playback content, the ID of the playback content, and the playback progress, the mobile device 100 downloads, from the server based on the resource link of the playback content and the ID of the playback content, the audio played by the electronic device 300, and the mobile device 100 determines, based on the playback progress, the audio to be resumed playing.

It should be noted that, the mobile device 100 may download, from the server based on the resource link of the playback content and/or the ID of the playback content, a complete audio played by the electronic device 300, and the mobile device 100 determines, from the complete audio based on the playback progress, an audio to be played. For example, a segment of audio has a total of 10 minutes, and the playback progress indicates that the audio is played for 5 minutes and 10 seconds. In this case, the mobile device 100 may download the audio of 10 minutes from the server, the mobile device 100 determines that, the audio to be resumed playing is an audio that is 5 minutes and 10 seconds later and that is in the 10-minute audio. Alternatively, the mobile device 100 downloads, based on the at least one of the resource link of the playback content and the ID of the playback content and the playback progress, a part of audio that is not played by the electronic device 300, and the mobile device 100 determines the downloaded part of audio that is not played by the electronic device 300 as the audio to be played. For example, a segment of audio has a total of 10 minutes, and the playback progress indicates that the audio is played for 5 minutes and 10 seconds, the mobile device 100 can download, from the server, an audio that is 5 minutes and 10 minutes later and that is in the 10-minute audio, in addition, the downloaded audio after 5 minutes and 10 seconds is the audio to be played.

S805: The mobile device 100 obtains, based on playback information, the audio to be resumed playing corresponding to a video or the audio/video to be resumed playing.

Optionally, if the playback information includes the ID of the playback content and the playback progress, the mobile device 100 downloads, from the server based on the ID of the playback content, an audio corresponding to the video played by the electronic device 300, and the mobile device 100 determines, based on the playback progress, the audio corresponding to the video to be resumed playing. For example, if the playback progress indicates that the audio is played for 11 minutes and 2 seconds, the mobile device 100 resumes playing from 11 minutes and 2 seconds.

Optionally, if the playback information includes the resource link of the playback content and the playback progress, the mobile device 100 downloads, from the server based on the resource link of the playback content, the audio corresponding to the video played by the electronic device 300, and the mobile device 100 resumes playing, based on the playback progress, the audio on the video played by the electronic device 300.

Optionally, if the playback information includes the resource link of the playback content, the ID of the playback content, and the playback progress, the mobile device 100 downloads, from the server based on the resource link of the playback content and the ID of the playback content, the audio corresponding to the video played by the electronic device 300, and the mobile device 100 resumes playing, based on the playback progress, the audio on the video played by the electronic device 300.

It should be noted that the mobile device 100 can download, from the server based on the resource link of the playback content and/or the ID of the playback content, a complete audio corresponding to the complete video played by the electronic device 300. The mobile device 100 determines, from the complete audio based on the playback progress, the audio to be played. For example, a 60-minute video corresponds to 60-minute audio, and the playback progress indicates that the 60-minute audio is played for 30 minutes and 10 seconds. In this case, the mobile device 100 can download the 60-minute audio from the server, the mobile device 100 determines that the audio to be played is an audio that is 60 minutes and 10 seconds later and that is in the 600-minute audio. Alternatively, the mobile device 100 downloads, based on the at least one of the resource link of the playback content and the ID of the playback content and the playback progress, the audio that is played by the electronic device 300 and that is not played. The mobile device 100 determines that an audio corresponding to the downloaded part of video that is not played by the electronic device 300 is an audio to be played. For example, a segment of audio has a total of 60 minutes, and the playback progress indicates that the audio is played for 30 minutes and 10 seconds. The mobile device 100 may download, from the server, an audio that is 30 minutes and 10 seconds later and that is in the 60-minute audio corresponding to the 60-minute video, and the downloaded audio that is 30 minutes and 10 seconds later is the audio to be played.

S806: The mobile device 100 sends the audio to be resumed playing in S508 or S509 to the wearable device 200 through a Bluetooth channel between the mobile device 100 and the wearable device 200.

S807: The wearable device 200 plays the audio in S806.

It should be noted that, Embodiment 2 may be an independent embodiment, or may be an embodiment combined with Embodiment 1. When Embodiment 1 is combined with Embodiment 2, the method of Embodiment 1 may be performed before the method of Embodiment 2 in the method for resuming playing the audio. The combination of Embodiment 1 and Embodiment 2 may be as follows: The input of the user may trigger the wearable device 200 to generate the first key and send the first message including the first key to the electronic device 300. After the wearable device 200 receives the first response message sent by the electronic device 300, the wearable device 200 sends the Bluetooth MAC address or the Wi-Fi MAC address of the mobile device 100 to the electronic device 300. The electronic device 300 can establish the Bluetooth channel with the mobile device 100 based on the Bluetooth MAC address of the mobile device 100, and send, to the mobile device 100 through the Bluetooth channel, the playback information of the playback content currently played. Alternatively, the electronic device 300 can establish the Wi-Fi channel with the mobile device 100 based on the Wi-Fi MAC address of the mobile device 100, and send, to the mobile device 100 through the Wi-Fi channel, the playback information of the playback content currently played. The mobile device 100 resumes playing, based on the playback information, the audio corresponding to the playback content played on the electronic device 300. This can improve user experience.

Embodiment 3

Embodiment 3 relates to FIG. 9. Compared with Embodiment 1, Embodiment 3 includes a scenario of a remote control device 400. As shown in FIG. 9, a method 900 for resuming playing an audio includes the following steps.

S901 and S902 may be respectively the same as S701 and S702. Refer to descriptions of S701 and S702. Details are not described herein again.

S903: The wearable device 200 sends the first message through the first antenna, where the first message includes the first key; and the remote control device 400 receives the first message sent by the wearable device 200, and obtains the first key in the first message.

The first message is used to request the remote control device 400, to resume playing an audio corresponding to current playback content on the electronic device 300. For example, the current playback content on the electronic device 300 may include a video, an audio, or an audio/video. If the current playback content on the electronic device 300 is a video, the first message is used to request the remote control device 400 to resume playing an audio correspond- ing to a current video of the electronic device 300. If the current playback content on the electronic device 300 is an audio, the first message is used to request the remote control device 400 to resume playing current audio of the electronic device 300. If the current playback content on the electronic device 300 is an audio/video, the first message is used to request the remote control device 400 to resume playing an audio corresponding to the audio/video currently played by the electronic device 300.

It may be understood that the first antenna is consistent with descriptions in S703. For details, refer to the descrip- tions in S703.

Optionally, a manner in which the wearable device 200 may send the first message through the first antenna may be broadcast sending.

Optionally, the wearable device 200 sends an ultra-short distance packet to the remote control device 400 through the first antenna. The ultra-short distance packet includes the first message. For example, a source address of the ultra- short distance packet is a Bluetooth MAC address of the wearable device 200, and a destination address of the ultra-short distance packet may be empty.

For example, if the user wants to resume playing an audio corresponding to playback content on the electronic device 300 to the mobile device 100, and play the audio by using the wearable device 200, the user may move the wearable device 200 to a place near the remote control device 400. After the movement, when a distance between the wearable device 200 and the remote control device 400 is shorter than the first transmitting distance, the wearable device 200 may send, to the remote control device 400 through the first antenna, the first message that carries the first key, the remote control device 400 is located within a first transmit- ting distance of the first antenna, and the first message that carries the first key can be received. This can ensure that the first key can be sent to only the remote control device 400, but not to another device. This can improve security.

S904: After receiving the first message, the remote control device 400 sends a first response message corresponding to the first message to the wearable device 200.

The first response message corresponding to the first message indicates that the remote control device 400 has received the first message.

For example, a source address of a packet that carries the first response message in S704 is a Bluetooth MAC address of the remote control device 400, and a destination address is the Bluetooth MAC address of the wearable device 200.

Optionally, the wearable device 200 may continuously send the first message in S703 within a preset time period through the first antenna. If the wearable device 200 does not receive, within the preset time period, the first response message returned by the remote control device 400, the process ends and S905 is not performed. For example, the preset time period is 3 seconds.

The first message and the first response message may be in a format specified in a protocol, that is, the wearable device 200 may send the first message according to the format specified in the protocol, and the remote control device 400 may parse the first message according to the format specified in the protocol. Similarly, the remote con- trol device 400 may send the first response message accord- ing to the format specified in the protocol, and the wearable device 200 may parse the first response message according to the format specified in the protocol.

S905: The wearable device 200 sends, to the electronic device 300 through a second antenna, a Bluetooth MAC address that is of the mobile device 100 and that is encrypted by using the first key.

Specifically, a source address of the first response mes- sage in S904 is the Bluetooth MAC address of the remote control device 400. Therefore, the wearable device 200 may send the Bluetooth MAC address of the mobile device 100 to the remote control device 400 through the second antenna.

Optionally, S905 includes: The wearable device 200 sends an ultra-short distance packet to the remote control device 400 through the second antenna, where the ultra-short dis- tance packet includes the Bluetooth MAC address of the mobile device 100. For example, a source address of a packet header of the ultra-short distance packet is the Bluetooth MAC address of the wearable device 200, a destination address is the Bluetooth MAC address of the remote control device 400, and a packet body may include the Bluetooth MAC address of the mobile device 100.

It may be understood that the second antenna may be a strong antenna, and a second transmitting distance for trans- mitting a signal by the second antenna is greater than the first transmitting distance. For example, the second antenna may be the antenna 3 in FIG. 4A, or the second antenna may be the antenna 3 in FIG. 4B. In this case, transmitting power of the antenna 3 in FIG. 4B is second transmitting power, and a distance for transmitting a wireless signal is the second transmitting distance. The remote control device 400 is located within the second transmitting distance of the second antenna, and may receive the Bluetooth MAC address of the mobile device 100 that is encrypted by using the first key.

Optionally, in an alternative manner of S905, the wearable device 200 may encrypt a Wi-Fi MAC address of the mobile device 100 by using the first key, and then send the encrypted Wi-Fi MAC address to the electronic device 300. A manner in which the wearable device 200 obtains the Wi-Fi MAC address of the mobile device 100 is not limited.

For example, the wearable device 200 may establish a Wi-Fi channel with the mobile device 100. In a process of establishing the Wi-Fi channel, the wearable device 200 may obtain the Wi-Fi MAC address of the mobile device 100.

For another example, before S901, the wearable device 200 has performed Bluetooth pairing with the mobile device 100. After the wearable device 200 is paired with the mobile device 100, a Bluetooth channel exists between the wearable device 200 and the mobile device 100. The wearable device 200 can send a Wi-Fi MAC address request message to the mobile device 100 through the Bluetooth channel, and the mobile device 100 sends a Wi-Fi MAC address response message to the wearable device 200 through the Bluetooth channel, where the Wi-Fi MAC address response message includes the Wi-Fi MAC address of the mobile device 100.

In S903 to S905, the wearable device 200 can first send the first message, the remote control device 400 returns the first response message, and the wearable device 200 sends the Bluetooth MAC address of the mobile device 100 to the electronic device 300 when it is ensured that the wearable device 200 can communicate with the remote control device 400. This can improve security, and can avoid leakage of the Bluetooth MAC address of the mobile device 100.

In an alternative manner of S903 to S905, the wearable device 200 sends the first message to the remote control device 400 through the first antenna. The first message includes the Bluetooth MAC address of the mobile device 100. In this way, this can avoid signaling overheads caused when the wearable device 200 first sends the first message and then sends the Bluetooth MAC address of the mobile device 100.

S906: The electronic device 300 decrypts, by using the first key, the encrypted Bluetooth MAC address of the mobile device 100, to obtain the Bluetooth MAC address of the mobile device 100.

Optionally, if the wearable device 200 sends the encrypted Wi-Fi MAC address in S705, in an alternative manner of S706, the electronic device may decrypt, by using the first key, the encrypted Wi-Fi MAC address of the mobile device 100, to obtain the Wi-Fi MAC address of the mobile device 100.

S907: The remote control device 400 sends the Bluetooth MAC address of the mobile device 100 to the electronic device 300.

For example, the remote control device 400 sends a packet to the electronic device 300 through a Bluetooth channel between the remote control device 400 and the electronic device 300. A source address of a packet header of the packet is the Bluetooth MAC address of the remote control device 400, a destination address is a Bluetooth MAC address of the electronic device 300, and a packet body may include the Bluetooth MAC address of the mobile device 100. Alternatively, if the Wi-Fi MAC address of the mobile device 100 is obtained in S906, the packet body of the packet may include the Wi-Fi MAC address of the mobile device 100 of the mobile device 100.

For another example, the remote control device 400 sends the Bluetooth MAC address or the Wi-Fi MAC address of the mobile device 100 to the electronic device 300 through another channel between the remote control device 400 and the electronic device 300. This is not limited in this embodiment of this application.

In the foregoing Embodiment 3, the wearable device 200 generates the first key, and sends the first key to the remote control device 400 through the first antenna. The wearable device 200 can encrypt the Bluetooth MAC address or the Wi-Fi MAC address of the mobile device 100 by using the first key, and send the encrypted Bluetooth MAC address or the encrypted Wi-Fi MAC address to the remote control device 400 through the second antenna. The remote control device 400 performs decryption by using the first key to obtain the Bluetooth MAC address of the mobile device 100 or the Wi-Fi MAC address of the mobile device 100, and sends the obtained Bluetooth MAC address of the mobile device 100 or the Wi-Fi MAC address of the mobile device 100 to the electronic device 300.

The foregoing Embodiment 3 can be combined with Embodiment 2, that is, after obtaining the Bluetooth MAC address of the mobile device 100 or the Wi-Fi MAC address of the mobile device 100 through Embodiment 3, the electronic device can be used to perform Embodiment 2.

It should be noted that, in Embodiment 1, in a scenario in which the wearable device 200 can directly communicate with the electronic device 300, and the foregoing method embodiment describes one electronic device 300. If there are more than two electronic devices 300, two electronic devices 300 can receive first messages sent by the wearable device 200 through the first antenna, the two electronic devices 300 can send first response messages to the wearable device 200, and the wearable device 200 can determine, based on a sequence of the first response messages, an electronic device 300 to which the MAC address (the Bluetooth MAC address or the Wi-Fi MAC address) of the mobile device 100 is sent. For example, the wearable device 200 can send the MAC address of the mobile device 100 to the electronic device 300 that first sends the first response message. Optionally, in a scenario in which Embodiment 1 and Embodiment 2 are combined, and in a scenario in which the wearable device 200 can directly communicate with the electronic device 300, the first message sent by the wearable device 200 through the first antenna includes the MAC address of the mobile device 100. That is, the wearable device 200 does not need to send the MAC address of the mobile device 100 to the electronic device 300 after receiving the first response message. That is, the two electronic devices 300 can receive MAC addresses of the mobile device 100. The two electronic devices 300 establish channels with the mobile device 100 based on the MAC addresses of the mobile device 100. In a possible implementation, the mobile device 100 can determine an electronic device 300 to establish a channel with, for example, an electronic device 300 that first initiates a request for establishing a channel, that is, the mobile device 100 establishes the channel with the electronic device 300. In another possible implementation, the two electronic devices 300 establish channels with the mobile device 100, and send playback information to the mobile device 100 through the established channels. The mobile device 100 may determine to resume playing an audio corresponding to playback content on a mobile device 100. For example, if an electronic device 300 first sends the playback information, the mobile device 100 resumes playing an audio corresponding to playback content on the electronic device 300, or the two electronic devices 300 simultaneously send the playback information, in this case, the mobile device 100 determines to resume playing an audio corresponding to playback content on an electronic device 300, or the user participates in determining to play an audio corresponding to playback content on an electronic device 300.

It should also be noted that, in Embodiment 3, in a scenario in which the wearable device 200 communicates with the electronic device 300 by using the remote control device 400, the foregoing method embodiment describes one electronic device 300. If there are more than two electronic devices 300, there are also more than two remote control devices 400 that are separately configured to control the two electronic devices 300. Two remote control devices 400 can receive first messages sent by the wearable device 200 through the first antenna, and the two remote control devices 400 can send first response messages to the wearable device 200. The wearable device 200 can determine, based on a sequence of the first response messages, a remote control device 400 to which the MAC address (the Bluetooth MAC address or the Wi-Fi MAC address) of the mobile device 100 is sent. For example, the wearable device 200 can send the MAC address of the mobile device 100 to the remote control device 400 that first sends the first response message. Optionally, in a scenario in which Embodiment 3 and Embodiment 2 are combined, and in a scenario in which the wearable device 200 communicates with the electronic device 300 by using the remote control device 400, the first message sent by the wearable device 200 through the first antenna includes the MAC address of the mobile device 100. That is, the wearable device 200 does not need to send the MAC address of the mobile device 100 to the remote control device 400 after receiving the first response message. That is, the two remote control devices 400 can receive MAC addresses of the mobile device 100. The two remote control devices 400 forward the MAC addresses of the mobile device 100 to the corresponding electronic device 300, and the two electronic devices 300 can establish channels with the mobile device 100 based on the MAC addresses of the mobile device 100. In a possible implementation, the mobile device 100 can determine an electronic device 300 to establish a channel with, for example, an electronic device 300 that first initiates a request for establishing a channel, that is, the mobile device 100 establishes the channel with the electronic device 300. In another possible implementation, the two electronic devices 300 establish channels with the mobile device 100, and send playback information to the mobile device 100 through the established channels. The mobile device 100 may determine to resume playing an audio corresponding to playback content on an electronic device 300. For example, if an electronic device 300 first sends the playback information, the mobile device 300 resumes playing an audio corresponding to playback content on the electronic device 300, or the two electronic devices 300 simultaneously send the playback information, in this case, the mobile device 100 determines to resume playing an audio corresponding to playback content on an electronic device 300, or the user participates in determining to play an audio corresponding to playback content on an electronic device 300.

Embodiment 4

Figure 10:
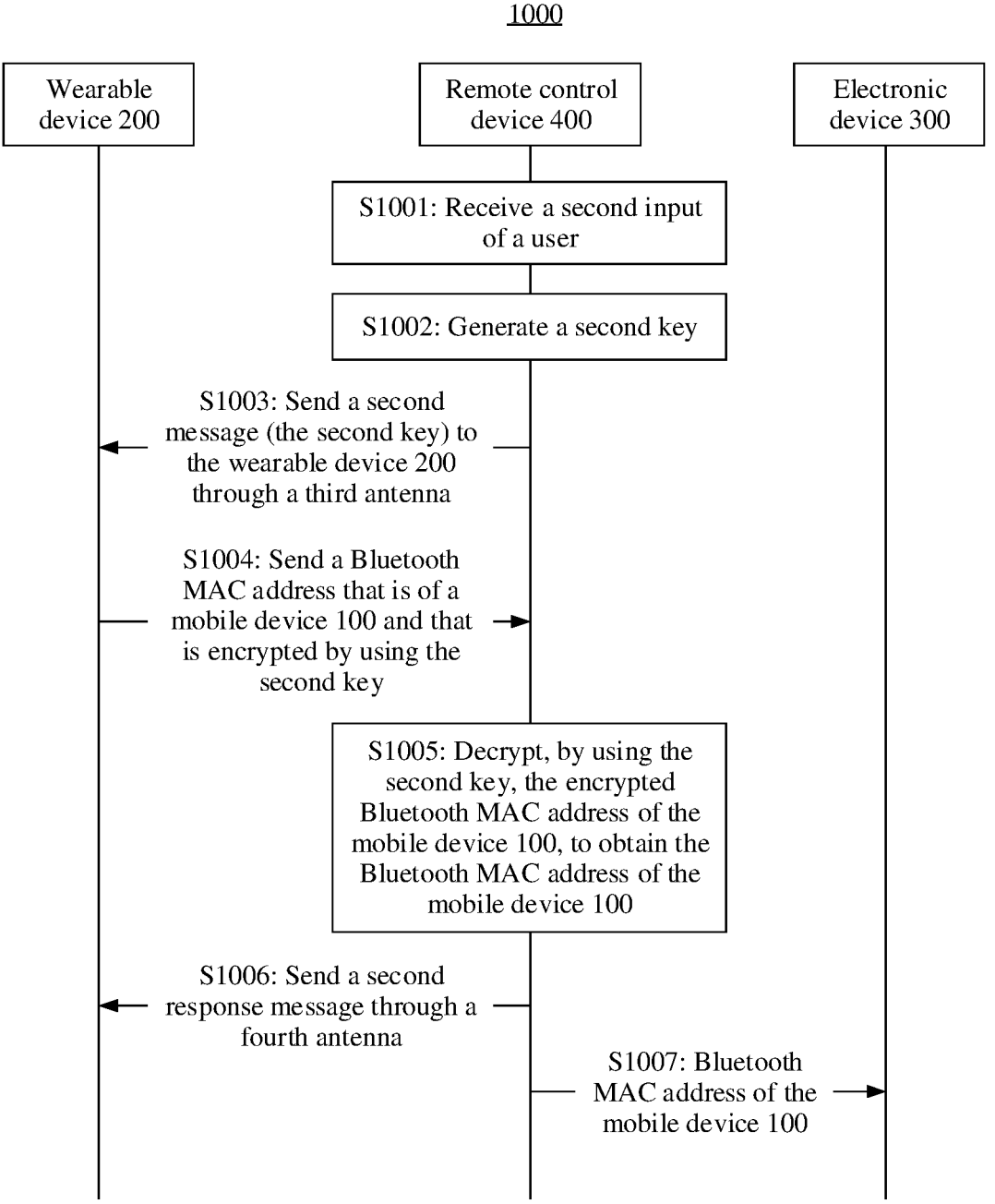
FIG. 10 is a schematic diagram of Embodiment 4 of a method for resuming playing an audio according to an embodiment of this application.

Embodiment 4 relates to FIG. 10. As shown in FIG. 10, a method 1000 for resuming playing an audio is shown. The method 1000 includes the following steps.

S1001: The remote control device 400 receives a second input of a user.

For example, when the user presses a button of the remote control device 400, the remote control device 400 may receive the second input of the user.

S1002: The remote control device 400 generates a second key.

Specifically, the remote control device 400 may randomly generate the second key, for example, randomly generate the second key by using an algorithm. A manner of generating the second key is not limited in this embodiment of this application.

S1003: The remote control device 400 sends a second message through a third antenna, where the second message includes the second key, and the wearable device 200 may receive, within a first transmitting distance of the third antenna, the second message sent by the remote control device 400.

For example, the second message indicates that the remote control device 400 may receive a resuming playing service request sent by another device, that is, the remote control device 400 supports a resuming playing service. The second message may also be referred to as a resuming playing service broadcast message.

It may be understood that the third antenna may be a weak antenna, and a first transmitting distance for transmitting a signal by the third antenna is shorter than or equal to a preset transmitting distance. For example, the third antenna may be the antenna 4 in FIG. 4A, or the third antenna may be the antenna 3 in FIG. 4B. In this case, transmitting power of the antenna 3 in FIG. 4B is first transmitting power, and a distance for transmitting a wireless signal is the first transmitting distance.

Optionally, a manner in which the remote control device 400 may send the second message through the third antenna may be broadcast sending.

Optionally, the remote control device 400 sends an ultra-short distance packet through the third antenna. The ultra-short distance packet includes the second message. For example, a source address of the ultra-short distance packet is a Bluetooth MAC address of the remote control device 400, and a destination address of the ultra-short distance packet may be empty.

For example, if the user wants to resume playing an audio corresponding to playback content on the electronic device 300 to the mobile device 100, and play the audio by using the wearable device 200, the user may move the wearable device 200 to a place near the remote control device 400. After the movement, when a distance between the wearable device 200 and the remote control device 400 is shorter than the first transmitting distance, the remote control device 400 may send, through the third antenna, the second message that carries the second key. This can ensure that the second key can be sent to only the wearable device 200, but not to another device. This can improve security.

S1004: The wearable device 200 sends, to the remote control device 400 by using the second key, a Bluetooth MAC address that is of the mobile device 100 and that is encrypted by using the second key.

Specifically, a source address of the second message in S1003 is the Bluetooth MAC address of the remote control device 400. Therefore, the wearable device 200 may send the Bluetooth MAC address of the mobile device 100 to the remote control device 400.

It may be understood that before S1004, the wearable device 200 has performed Bluetooth pairing with the mobile device 100. In a process of pairing the wearable device 200 with the mobile device 100, the wearable device 200 may obtain the Bluetooth MAC address of the mobile device 100.

Optionally, S1004 includes: The wearable device 200 sends an ultra-short distance packet to the electronic device 300, where the ultra-short distance packet includes the Bluetooth MAC address of the mobile device 100. For example, a source address of a packet header of the ultra-short distance packet is a Bluetooth MAC address of the wearable device 200, a destination address is the Bluetooth MAC address of the remote control device 400, and a packet body may include the Bluetooth MAC address of the mobile device 100.

Optionally, in an alternative manner of S1004, the wearable device 200 may encrypt a Wi-Fi MAC address of the mobile device 100 by using the second key, and then send the encrypted Wi-Fi MAC address to the remote control device 400. For a manner in which the wearable device 200 obtains the Wi-Fi MAC address of the mobile device 100, refer to descriptions of S705.

S1005: The remote control device 400 decrypts, by using the second key, the encrypted Bluetooth MAC address of the mobile device 100, to obtain the Bluetooth MAC address of the mobile device.

Optionally, if the wearable device 200 sends the encrypted Wi-Fi MAC address in S1004, in an alternative manner of S1005, the remote control device 400 may decrypt, by using the second key, the encrypted Wi-Fi MAC address of the mobile device 100, to obtain the Wi-Fi MAC address of the mobile device 100.

S1006: The remote control device 400 sends a second response message to the wearable device 200 through a fourth antenna, and the wearable device 200 may receive, within a second transmitting distance of the fourth antenna, the second response message sent by the remote control device.

The second response message in S1006 indicates that the remote control device 400 receives the Bluetooth MAC address that is of the mobile device 100 and that is sent by the wearable device 200, that is, the second response message is a response message corresponding to the second message.

It may be understood that the fourth antenna may be a strong antenna, and a second transmitting distance for transmitting a signal by the fourth antenna is greater than the first transmitting distance. For example, the fourth antenna may be the antenna 3 in FIG. 4A, or the fourth antenna may be the antenna 3 in FIG. 4B. In this case, transmitting power of the antenna 3 in FIG. 4B is second transmitting power, and a distance for transmitting a wireless signal is the second transmitting distance.

S1007: The remote control device 400 sends the Bluetooth MAC address of the mobile device 100 to the electronic device 300.

The remote control device 400 herein includes the third antenna and the fourth antenna. For the remote control device 400, the fourth antenna belongs to "the second antenna" of the remote control device 400. This is to avoid confusion in use of "the second antenna", and "the fourth antenna" is used for expression. Correspondingly, the third antenna belongs to "the first antenna" of the mobile device. This is also used to avoid confusion, and "the third antenna" is used for expression. In other words, using "the fourth antenna" for expression does not mean that the remote control device 400 includes at least four antennas, but is intended to avoid confusion in expression. That is, the remote control device 400 may include two antennas: "the third antenna" and "the fourth antenna", and the remote control device 400 is not required to have four antennas.

In the foregoing Embodiment 4, the remote control device 400 generates the second key, and sends the second key to the wearable device 200 through the third antenna. The wearable device 200 can encrypt the Bluetooth MAC address or the Wi-Fi MAC address of the mobile device 100 by using the second key, and send the encrypted Bluetooth MAC address or the encrypted Wi-Fi MAC address to the remote control device 400. The remote control device 400 performs decryption by using the second key to obtain the Bluetooth MAC address of the mobile device 100 or the Wi-Fi MAC address of the mobile device 100, and sends the obtained Bluetooth MAC address of the mobile device 100 or the Wi-Fi MAC address of the mobile device 100 to the electronic device 300.

The foregoing Embodiment 4 may be combined with Embodiment 2, and the method in Embodiment 4 may be performed before the method in Embodiment 2.

Optionally, in some embodiments, an embodiment of this application further provides a computer-readable medium. The computer-readable medium stores program code. When the computer program code is run on a computer, the computer is enabled to perform the method in the foregoing aspects.

Optionally, in some embodiments, an embodiment of this application further provides a computer program product. The computer program product includes computer program code. When the computer program code is run on a computer, the computer is enabled to perform the method in the foregoing aspects.

In embodiments of this application, the terminal device or the network device includes a hardware layer, an operating system layer running on the hardware layer, and an application layer running on the operating system layer. The hardware layer may include hardware such as a central processing unit (central processing unit, CPU), a memory management unit (memory management unit, MMU), and a memory (which is also referred to as a main memory). An operating system at the operating system layer may be any one or more computer operating systems that implement service processing through a process (process), for example, a Linux operating system, a Unix operating system, an Android operating system, an iOS operating system, or a Windows operating system. The application layer may include applications such as a browser, an address book, word processing software, and instant communication software.

A specific structure of an execution body of the method provided in embodiments of this application is not specifically limited in embodiments of this application, provided that a program that records code of the method provided in embodiments of this application can be run to perform communication according to the method provided in embodiments of this application. For example, the execution body of the method provided in embodiments of this application may be the terminal device or the network device, or a function module that is in the terminal device or the network device and that can invoke and execute the program.

Aspects or features of this application may be implemented as a method, an apparatus or a product that uses standard programming and/or engineering technologies. The term "product" used in this specification may cover a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (compact disc, CD) or a digital versatile disc (digital versatile disc, DVD)), a smart card, and a flash memory component (for example, an erasable programmable read-only memory (erasable programmable read-only memory, EPROM), a card, a stick, or a key drive).

Various storage media described in this specification may indicate one or more devices and/or other machine-readable media that are configured to store information. The term "machine-readable media" may include but is not limited to a wireless channel and various other media that can store, include, and/or carry instructions and/or data.

It should be understood that the processor in embodiments of this application may be a central processing unit (central processing unit, CPU), another general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, a discrete hardware component, or the like. The general-purpose processor may be a microprocessor, or the processor may be any conventional processor or the like.

It may be understood that the memory mentioned in embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM). For example, the RAM may be used as an external cache. As an example instead of a limitation, the RAM may include the following plurality of forms: a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA or another programmable logic device, a discrete gate or transistor logic device, or a discrete hardware component, the memory (storage module) may be integrated into the processor.

It should further be noted that the memory described in this specification is intended to include but is not limited to these memories and any memory of another proper type.

A person of ordinary skill in the art may be aware that, in combination with the examples described in embodiments disclosed in this specification, units and methods may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the protection scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is only an example. For example, division into the units is only logical function division and may be other division in actual implementation. For example, a plurality of units or components may be combined or integrated into another system, or some features may be ignored or not performed. In addition, the displayed or discussed mutual couplings, direct couplings, or communication connections may be implemented through some interfaces. Indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, function units in embodiments of this application may be integrated into one unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a computer software product. The computer software product is stored in a storage medium, and includes several instructions for instructing a computer device (which may be a personal computer, a server, a network device, or the like) to perform all or some of the steps of the method described in embodiments of this application. The foregoing storage medium may include but is not limited to any medium that can store program code, such as a USB flash drive, a removable hard disk, a read-only memory (read-only memory, ROM), a random access memory (random access memory, RAM), a magnetic disk, or an optical disc.

Unless otherwise defined, all technical and scientific terms used in this specification have same meanings as those usually understood by a person skilled in the art of this application. The terms used in the specification of this application are only for the purpose of describing specific embodiments, and are not intended to limit this application.

The foregoing descriptions are only specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:

receiving, by a wearable device, a first input of a user;

generating, by the wearable device, a first key based on the first input;

sending, by the wearable device, a first message to a remote control device through a first antenna, wherein the first message comprises the first key, a first maximum transmitting distance of the first antenna is a first transmitting distance, and the first transmitting distance is shorter than a preset transmitting distance;

sending, by the remote control device, a first response message corresponding to the first message to the wearable device;

sending, by the wearable device, a media access control (MAC) address of a mobile device paired with the wearable device to the remote control device, wherein the remote control device is configured to control an electronic device, and wherein sending, by the wearable device, the MAC address of the mobile device to the remote control device comprises:

sending, by the wearable device to the remote control device through a second antenna, the MAC address of the mobile device that is encrypted using the first key to obtain an encrypted MAC address, wherein a second maximum transmitting distance of the second antenna is a second transmitting distance, and the second transmitting distance is shorter than the first transmitting distance;

decrypting, by the remote control device by using the first key, the encrypted MAC address of the mobile device to obtain the MAC address of the mobile device;

sending, by the remote control device, the MAC address of the mobile device to the electronic device;

sending, by the electronic device, playback information of current playback content on the electronic device to the mobile device based on the MAC address of the mobile device, wherein the current playback content comprises a video or an audio/video; and resuming playing, by the mobile device based on the playback information, an audio corresponding to the current playback content by using the wearable device.

2. The method according to claim 1, wherein the playback information comprises at least one of a name of the current playback content, an identifier of the current playback content, a playback progress of the current playback content, a resource link of the current playback content, a playback type of the current playback content, or a uniform resource locator (URL) format that is of a resource and that corresponds to the resource link of the current playback content.

3. The method according to claim 1, wherein the MAC address of the mobile device comprises a Bluetooth MAC address of the mobile device; and before sending, by the wearable device, the MAC address of the mobile device paired with the wearable device to the remote control device, the method further comprises:

obtaining, by the wearable device, the Bluetooth MAC address of the mobile device in a process of establishing a Bluetooth channel with the mobile device.

4. The method according to claim 3, wherein sending, by the electronic device, the playback information of the current playback content on the electronic device to the mobile device based on the MAC address of the mobile device comprises:

establishing, by the electronic device, the Bluetooth channel with the mobile device based on the Bluetooth MAC address of the mobile device; and sending, by the electronic device, the playback information to the mobile device through the Bluetooth channel between the electronic device and the mobile device.

5. The method according to claim 4, wherein the MAC address of the mobile device further comprises a Wi-Fi MAC address of the mobile device, and the method further comprises:

sending, by the wearable device, a Wi-Fi MAC address request message to the mobile device through the Bluetooth channel between the wearable device and the mobile device; and sending, by the mobile device, a Wi-Fi MAC address response message to the wearable device through the Bluetooth channel between the wearable device and the mobile device, wherein the Wi-Fi MAC address response message comprises the Wi-Fi MAC address of the mobile device; and wherein sending, by the electronic device, the playback information of the current playback content on the electronic device to the mobile device based on the MAC address of the mobile device, comprises:

establishing, by the electronic device, a Wi-Fi channel with the mobile device based on the Wi-Fi MAC address of the mobile device; and sending, by the electronic device, the playback information to the mobile device through the Wi-Fi channel.

6. The method according to claim 1, wherein the mobile device communicates wirelessly with the wearable device.

7. The method according to claim 1, wherein the current playback content comprises video.

8. The method according to claim 1, wherein the current playback content comprises audio/video.

9. The method according to claim 1, wherein the preset transmitting distance is based on information security.

10. The method according to claim 1, wherein the playback information comprises a playback progress of the current playback content; and wherein resuming playing, by the mobile device based on the playback information, the audio corresponding to the current playback content by using the wearable device comprises:

resuming playing, by the mobile device based on the playback information, the audio corresponding to the current playback content by using the wearable device from a playback moment indicated by the playback progress of the current playback content.

11. A system, comprising:

a mobile device;

an electronic device;

a remote control device; and a wearable device, configured to:

receive a first input of a user;

generate a first key based on the first input;

send a first message to the remote control device through a first antenna, wherein the first message comprises the first key, a first maximum transmitting distance of the first antenna is a first transmitting distance, and the first transmitting distance is shorter than a preset transmitting distance;

wherein the remote control device is configured to:

send a first response message corresponding to the first message to the wearable device;

wherein the wearable device is further configured to:

send a media access control (MAC) address of the mobile device to the remote control device, wherein the mobile device is paired with the wearable device, the remote control device is configured to control the electronic device, and wherein sending the MAC address of the mobile device to the remote control device comprises:

sending, to the remote control device through a second antenna, the MAC address of the mobile device that is encrypted using the first key to obtain an encrypted MAC address, wherein a second maximum transmitting distance of the second antenna is a second transmitting distance, and the second transmitting distance is shorter than the first transmitting distance;

wherein the remote control device is further configured to:

decrypt, by using the first key, the encrypted MAC address of the mobile device to obtain the MAC address of the mobile device; and send the MAC address of the mobile device to the electronic device;

wherein the electronic device is configured to:

send playback information of current playback content on the electronic device to the mobile device based on the MAC address of the mobile device, wherein the current playback content comprises a video or an audio/video; and wherein the mobile device is configured to:

resume playing, based on the playback information, an audio corresponding to the current playback content by using the wearable device.

12. The system according to claim 11, wherein the playback information comprises at least one of a name of the current playback content, an identifier of the current playback content, a playback progress of the current playback content, a resource link of the current playback content, a playback type of the current playback content, or a uniform resource locator (URL) format that is of a resource and that corresponds to the resource link of the current playback content.

13. The system according to claim 11, wherein the MAC address of the mobile device comprises a Bluetooth MAC address of the mobile device; and wherein the wearable device is further configured to:

before sending the MAC address of the mobile device paired with the wearable device to the remote control device, obtain the Bluetooth MAC address of the mobile device in a process of establishing a Bluetooth channel with the mobile device.

14. The system according to claim 13, wherein the electronic device is configured to:

establish the Bluetooth channel with the mobile device based on the Bluetooth MAC address of the mobile device; and send the playback information to the mobile device through the Bluetooth channel between the electronic device and the mobile device.

15. The system according to claim 14, wherein the MAC address of the mobile device further comprises a Wi-Fi MAC address of the mobile device;

wherein the wearable device is further configured to:

send a Wi-Fi MAC address request message to the mobile device through the Bluetooth channel between the wearable device and the mobile device;

wherein the mobile device is configured to:

send a Wi-Fi MAC address response message to the wearable device through the Bluetooth channel between the wearable device and the mobile device, wherein the Wi-Fi MAC address response message comprises the Wi-Fi MAC address of the mobile device; and wherein the electronic device is configured to:

establish a Wi-Fi channel with the mobile device based on the Wi-Fi MAC address of the mobile device; and send the playback information to the mobile device through the Wi-Fi channel.

16. The system according to claim 11, wherein the mobile device communicates wirelessly with the wearable device.

17. The system according to claim 11, wherein the current playback content comprises video.

18. The system according to claim 11, wherein the current playback content comprises audio/video.

19. The system according to claim 11, wherein the preset transmitting distance is based on information security.

20. The system according to claim 11, wherein the playback information comprises a playback progress of the current playback content; and wherein the mobile device is configured to:

resume playing, by the mobile device based on the playback information, the audio corresponding to the current playback content by using the wearable device from a playback moment indicated by the playback progress of the current playback content.

* * * * *